US012591532B2

(12) United States Patent
Shveidel et al.

(10) Patent No.: US 12,591,532 B2
(45) Date of Patent: Mar. 31, 2026

(54) PRIORITIZED POLLING TECHNIQUES

(71) Applicant: Dell Products L.P., Hopkinton, MA (US)

(72) Inventors: Vladimir Shveidel, Pardes-Hana (IL); Yuri Chernyavsky, Petach Tikva (IL)

(73) Assignee: Dell Products L.P., Hopkinton, MA (US)

( * ) Notice: Subject to any disclaimer, the term of this patent is extended or adjusted under 35 U.S.C. 154(b) by 328 days.

(21) Appl. No.: 18/394,424

(22) Filed: Dec. 22, 2023

(65) Prior Publication Data

US 2025/0209020 A1      Jun. 26, 2025

(51) Int. Cl.
| | |
|---|---|
| *G06F 13/22* | (2006.01) |
| *G06F 9/38* | (2018.01) |
| *G06F 15/173* | (2006.01) |

(52) U.S. Cl.
CPC ............ *G06F 13/22* (2013.01); *G06F 9/3856* (2023.08); *G06F 15/17331* (2013.01)

(58) Field of Classification Search
CPC ............................... G06F 13/22; G06F 9/3856
See application file for complete search history.

(56) References Cited

U.S. PATENT DOCUMENTS

| | | | | | |
|---|---|---|---|---|---|
| 2013/0315237 | A1* | 11/2013 | Kagan | ................. | H04L 47/2441 370/389 |
| 2015/0261434 | A1* | 9/2015 | Kagan | .................... | G06F 13/28 711/103 |

| | | | | | |
|---|---|---|---|---|---|
| 2016/0117277 | A1* | 4/2016 | Raindel | ................... | G06F 9/546 710/112 |
| 2021/0191884 | A1* | 6/2021 | Hwang | ............... | G06F 13/1642 |
| 2022/0155997 | A1* | 5/2022 | Del Gatto | ............. | G06F 3/0635 |

OTHER PUBLICATIONS

U.S. Appl. No. 18/160,404, filed Jan. 27, 2023, entitled System and Method for Managing Data Portion Ownership in a Storage Cluster, Vladimir Shveidel, et al.
U.S. Appl. No. 17/154,179, filed Jan. 21, 2021, entitled Asymmetric Fulfillment of Remote Procedure Calls By Multi-Core Systems, Leonid Ravich, et al.

* cited by examiner

*Primary Examiner* — Zhiren Qin
(74) *Attorney, Agent, or Firm* — BainwoodHuang

(57) ABSTRACT

In at least one embodiment, processing can include: assigning services a non-critical polling priority or a critical polling priority, where each service is associated with a queue set including a completion queue (CQ) and receiving queue (RQ) associated with received messages stored in memory of the local node and sent by a remote node via remote direct memory access (RDMA); partitioning CQs of the queue sets in accordance with assigned polling priorities to generate a non-critical CQ list and a critical CQ list; polling the non-critical CQ list by a non-critical poller at a non-critical polling frequency for completion signals or indicators associated with received non-critical messages of the local node to be serviced; and polling the critical CQ list by a critical poller at a critical polling frequency for completion signals or indicators associated with received critical messages of the local node to be serviced.

20 Claims, 9 Drawing Sheets

700

702

For a set S1 of services, assign each service of the set S1 a polling priority of either a normal non-critical polling priority or a critical polling priority. Each service of S1 is associated with a corresponding service queue set on a local node.

Each service queue set of the local node associated with a corresponding one of the services of S1 includes: an RQ of WQEs associated with received messages sent by a remote node via RDMA to the local node; and a CQ of CQEs where the CQ is associated with the RQ. Additionally, each RQ of the service queue set of the local node can be configured to synchronize via RDMA with an SQ of the remote node such that when a first WQE1 (that is associated with an outgoing message stored in the remote node's memory) is enqueued in the remote node's SQ, the outgoing message of the remote node is sent via RDMA to the local node, where the outgoing message is received by the local node, and stored in an incoming message buffer of the local node's memory. The incoming buffer message buffer of the local node can be associated with a second WQE2 of the synchronized RQ of the local node.

Additionally, in response to storing the message in the incoming message buffer of the WQE2 of the RQ having an associated CQ, a completion signal or indicator is generated to indicate that the WQE2 of the RQ is associated with a received incoming message that needs servicing or handling by the service associated with the RQ. In at least one embodiment, the CQ can include a CQE associated with WQE2 and the received message of the local node, where the CQE serves as an indicator or signal that the received message associated with WQE2, and thus the CQE, needs servicing or handling by the local node.

704

Partition the CQs of the service queue sets associated with the services of the set S1 in accordance with assigned polling priorities to generate a non-critical CQ list of the local node and a critical CQ list of the local node. The non-critical CQ list includes CQs associated with each service of the set S1 assigned the normal non-critical polling priority; and the critical CQ list includes CQs associated with each service of the set S1 assigned the critical polling priority.

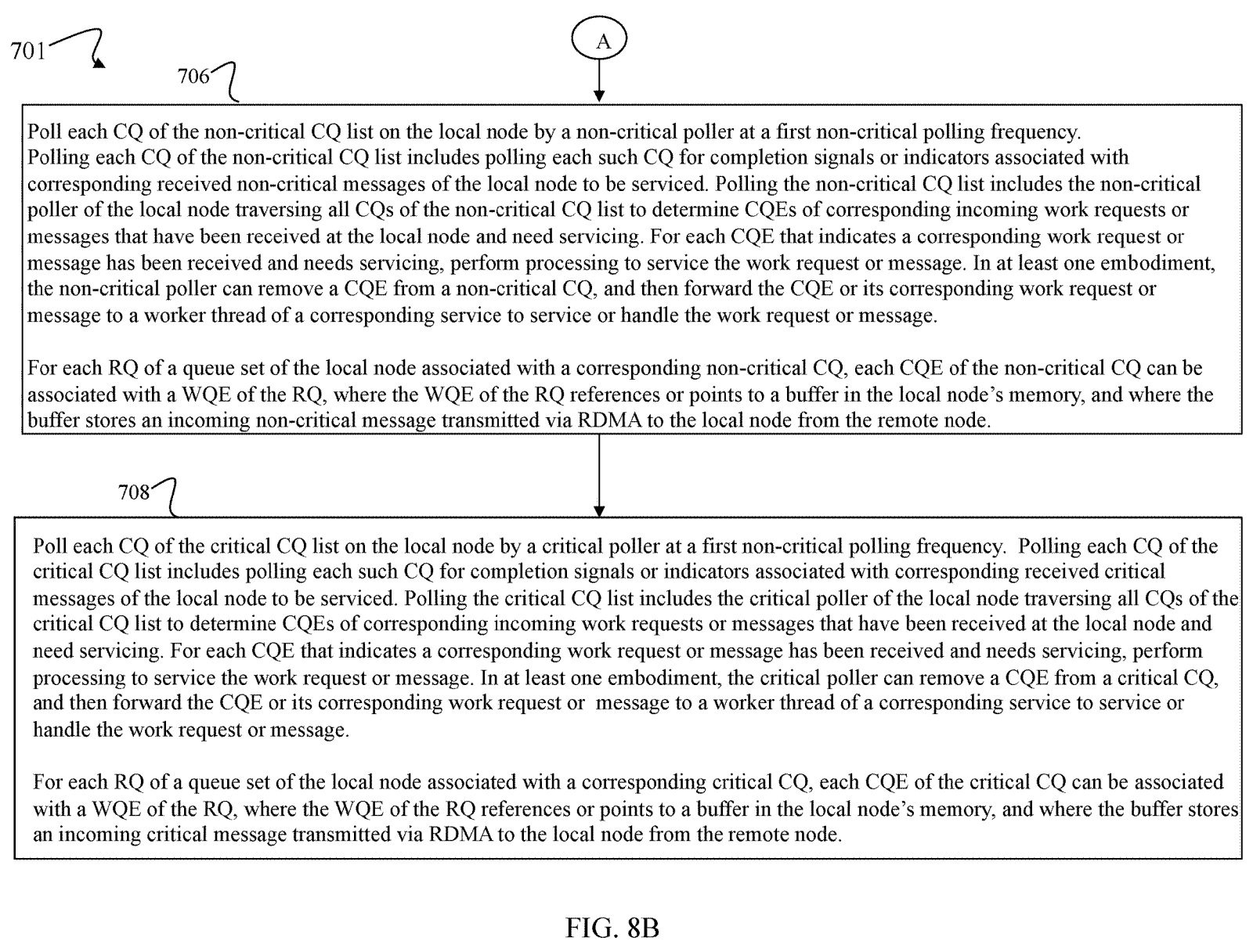

Poll each CQ of the non-critical CQ list on the local node by a non-critical poller at a first non-critical polling frequency. Polling each CQ of the non-critical CQ list includes polling each such CQ for completion signals or indicators associated with corresponding received non-critical messages of the local node to be serviced. Polling the non-critical CQ list includes the non-critical poller of the local node traversing all CQs of the non-critical CQ list to determine CQEs of corresponding incoming work requests or messages that have been received at the local node and need servicing. For each CQE that indicates a corresponding work request or message has been received and needs servicing, perform processing to service the work request or message. In at least one embodiment, the non-critical poller can remove a CQE from a non-critical CQ, and then forward the CQE or its corresponding work request or message to a worker thread of a corresponding service to service or handle the work request or message.

For each RQ of a queue set of the local node associated with a corresponding non-critical CQ, each CQE of the non-critical CQ can be associated with a WQE of the RQ, where the WQE of the RQ references or points to a buffer in the local node's memory, and where the buffer stores an incoming non-critical message transmitted via RDMA to the local node from the remote node.

708

Poll each CQ of the critical CQ list on the local node by a critical poller at a first non-critical polling frequency. Polling each CQ of the critical CQ list includes polling each such CQ for completion signals or indicators associated with corresponding received critical messages of the local node to be serviced. Polling the critical CQ list includes the critical poller of the local node traversing all CQs of the critical CQ list to determine CQEs of corresponding incoming work requests or messages that have been received at the local node and need servicing. For each CQE that indicates a corresponding work request or message. In at least one embodiment, the critical poller can remove a CQE from a critical CQ, and then forward the CQE or its corresponding work request or message to a worker thread of a corresponding service to service or handle the work request or message.

For each RQ of a queue set of the local node associated with a corresponding critical CQ, each CQE of the critical CQ can be associated with a WQE of the RQ, where the WQE of the RQ references or points to a buffer in the local node's memory, and where the buffer stores an incoming critical message transmitted via RDMA to the local node from the remote node.

FIG. 8B

PRIORITIZED POLLING TECHNIQUES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: for a first plurality of services, assigning each service of the first plurality a polling priority of a non-critical polling priority or a critical polling priority, wherein each service of the first plurality is associated with a corresponding service queue set of a second plurality of service queue sets of a local node, wherein each service queue set of the second plurality of service queue sets associated with a corresponding service of the first plurality includes a completion queue (CQ) and an associated receiving queue (RQ) of work queue entries (WQEs) associated with received messages that are stored in a first memory of the local node and sent by a remote node via remote direct memory access (RDMA); partitioning CQs of the second plurality of service queue sets associated with the first plurality of services in accordance with assigned polling priorities to generate a non-critical CQ list of the local node and a critical CQ list of the local node, wherein the non-critical CQ list includes CQs associated with services of the first plurality assigned the non-critical polling priority, and wherein the critical CQ list includes CQs associated with services of the first plurality assigned the critical polling priority; polling each CQ of the non-critical CQ list on the local node by a non-critical poller at a non-critical polling frequency, wherein said polling said each CQ of the non-critical CQ list includes polling said each CQ of the non-critical CQ list for completion signals or indicators associated with corresponding received non-critical messages of the local node to be serviced; and polling each CQ of the critical CQ list on the local node by a critical poller at a critical polling frequency, wherein said polling said each CQ of the critical CQ list includes polling said each CQ of the critical CQ list for completion signals or indicators associated with corresponding received critical messages of the local node to be serviced.

In at least one embodiment, each RQ of the second plurality of service queue sets can be configured to synchronize via RDMA with an SQ of the remote node such that when a first WQE (work queue element or entry), that is associated with an outgoing message stored in a second memory of the remote node, is enqueued in the SQ of the remote node, the outgoing message is sent via RDMA from the remote node to the local node, where the outgoing message is received by the local node and stored in an incoming message buffer of the first memory of the local node, wherein the incoming message buffer of the local node is associated with a second WQE of the RQ that synchronizes via RDMA with the SQ. Processing can include, in response to storing, via RDMA, the outgoing message of the remote node in the incoming message buffer of the second WQE of the RQ having an associated CQ on the local node, generating a completion signal or indicator to indicate that the second WQE of the RQ associated with the incoming message buffer needs servicing or handling by a service of the first plurality associated with the RQ. The CQ associated with the RQ can include a CQE associated with the second WQE and the incoming message buffer whereby the CQE serves as a signal or indicator that a received message of the local node stored in the incoming message buffer needs servicing or handling by the local node.

In at least one embodiment, processing can include, for each completion signal or indicator of a CQ of the non-critical list associated with a corresponding received non-critical message of the local node, servicing said received non-critical message by the local node. Servicing said received non-critical message of the local node can include forwarding any of: a CQE of the CQ where the CQE is associated with said received non-critical message, or a WQE of an RQ associated with the CQ where the WQE can be associated with said received non-critical message, to a worker thread of one service of the first plurality executing on the local node, wherein said one service can be assigned the non-critical polling frequency and said one service can be associated with the RQ and the CQ on the local node. For each RQ of a queue set of the second plurality that is associated with a corresponding CQ of the queue set of a service assigned the non-critical polling priority, each CQE of the corresponding CQ can be associated with a WQE of said each RQ wherein the WQE references a buffer in the first memory of the local node, and wherein the buffer stores an incoming non-critical message transmitted via RDMA from the local node to the remote node.

In at least one embodiment, processing can include, for each completion signal or indicator of a CQ of the critical list associated with a corresponding received critical message of the local node, servicing said received critical message by the local node. Servicing said received critical message of the local node can include forwarding any of: a CQE of the CQ where the CQE is associated with said received critical message, or a WQE of an RQ associated with the CQ where the WQE is associated with said received critical message, to a worker thread of one service of the first plurality executing on the local node, wherein said one service can be assigned the critical polling frequency and said one service can be associated with the RQ and the CQ on the local node. For each RQ of a queue set of the second plurality that is associated with a corresponding CQ of the queue set of a service assigned the critical polling priority, each CQE of the corresponding CQ can be associated with a WQE of said each RQ wherein the WQE references a buffer in the first memory of the local node, wherein the buffer stores an incoming critical message transmitted via RDMA from the local node to the remote node.

In at least one embodiment, the critical poller and the non-critical poller can be separate independent pollers. The critical poller can be a first dedicated critical polling thread that only performs critical polling of CQs associated with services of the first plurality assigned the critical polling priority, and wherein the non-critical poller can be a second dedicated non-critical polling thread that only performs non-critical polling of CQs associated with services of the first plurality assigned the non-critical polling priority. The critical polling frequency can indicate a greater polling frequency than the non-critical polling frequency such that critical polling, as performed by the critical poller, can be performed at a greater frequency that non-critical polling, as performed by the non-critical poller.

In at least one embodiment, a first service of the first plurality can be assigned the critical polling frequency, a first queue set of the second plurality can be associated with the first service, the first queue set can include a first RQ, and a first CQ that is associated with the first RQ and that signals completed receipt of critical messages by the local node. The first RQ can include WQEs associated with received map RPC (remote procedure call) requests each requesting that the local node performing address resolution mapping for an associated user data logical address owned by the local node but not the remote node. Each of the map RPC requests can be sent via RDMA from the remote node to the local node, and wherein the remote node can be an initiator of the map RPC requests issued to the remote node as a target of the map RPC requests. Each of the map RPC requests can be sent from the remote node to the local node via RDMA in response to the remote node receiving a read I/O directed to a target logical address that is owned by the local node but not the remote node.

In at least one embodiment, the first RQ includes WQEs associated with received map RPC (remote procedure call) replies received by the local node from the remote node in response to prior corresponding RPC requests sent from the local node to the remote node. Each of the RPC requests sent from the local node to the target node can be a request that the target node performing address resolution mapping for an associated user data logical address owned by the remote node but not the local node. Each of the map RPC requests can be sent via RDMA from the local node to the local node. Each of the map RPC replies can be sent via RDMA from the remote node to the local node. The local node can be an initiator of the map RPC requests issued to the remote node as a target of the map RPC requests. Each of the map RPC requests can be sent from the local node to the remote node via RDMA in response to the local node receiving a read I/O directed to a target logical address that is owned by the remote node but not the local node.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8A and 8B are flowcharts of processing steps that can be performed in at least one embodiment in accordance with the techniques of the present disclosure.

DETAILED DESCRIPTION OF EMBODIMENT(S)

Embodiments are described in the following paragraphs that provide for reducing latency introduced by RPC (remote procedure call) messages affecting end-to-end I/O latency. Such RPC messages in at least one embodiment can include map RPC requests and/or replies used in active-active storage systems including pairs of nodes where each node can service I/Os. Techniques of the present disclosure include using separate pollers for critical messages and non-critical messages. A first critical poller can perform critical polling on a node for received critical messages to be processed or serviced by the node. A second non-critical poller on a node can perform non-critical polling for receiving non-critical messages to be processed or serviced by the node. In at least one embodiment, the critical poller can be called more frequently than the non-critical poller, where the critical poller in a single critical polling cycle can be expected to perform less work and thus have a smaller critical polling cycle time in comparison to a non-critical polling cycle time. In at least one embodiment, the number of critical messages can be expected to be relatively small in comparison to the number of non-critical messages expected. In at least one embodiment, messages sent between a local node and a remote node in a system can be performed using Remote Direct Memory Access (RDMA).

The foregoing and other aspects of the techniques of the present disclosure are described in more detail in the following paragraphs.

Figure 1:
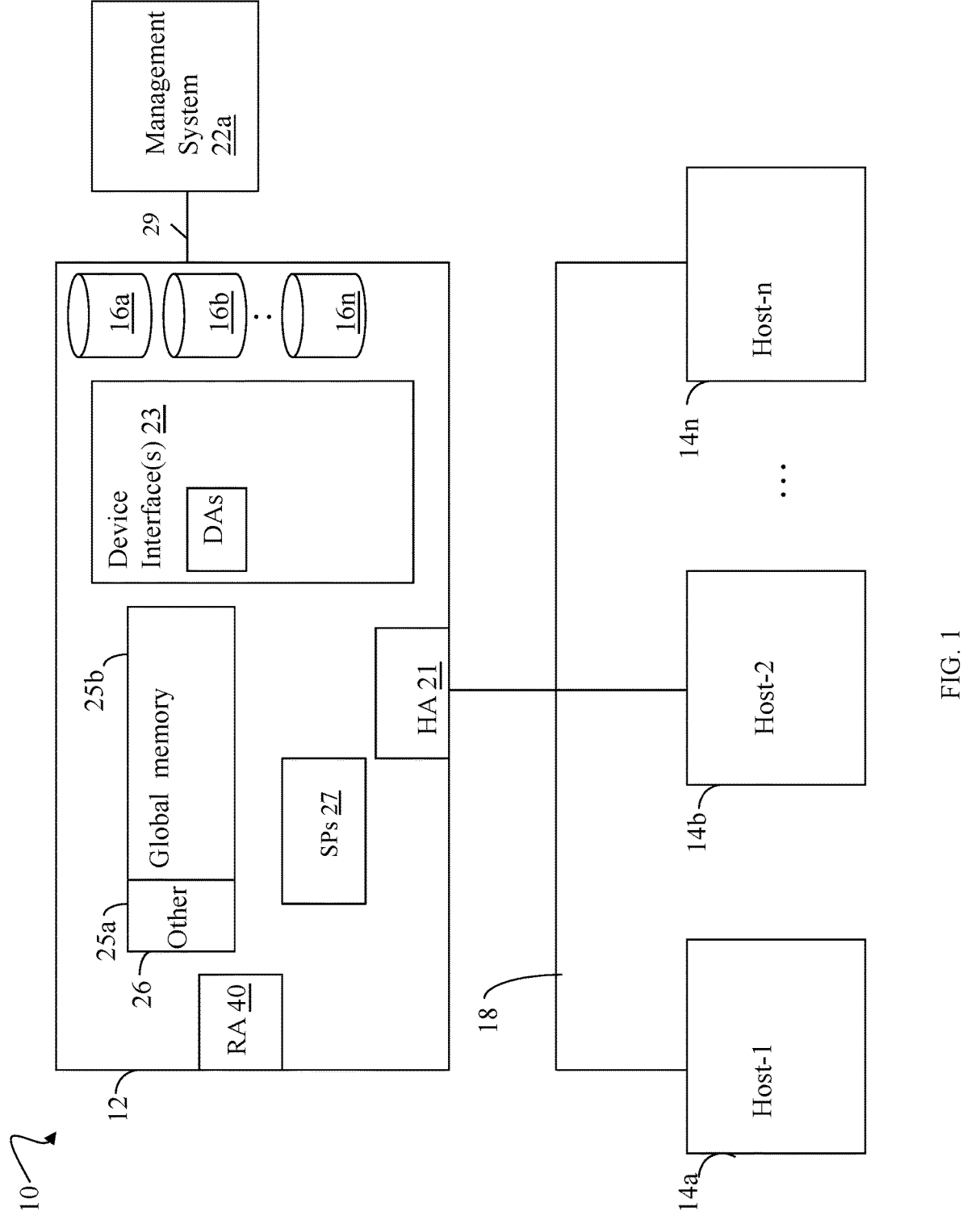
FIG. 1 is an example of components that may be included in a system in accordance with the techniques of the present disclosure.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
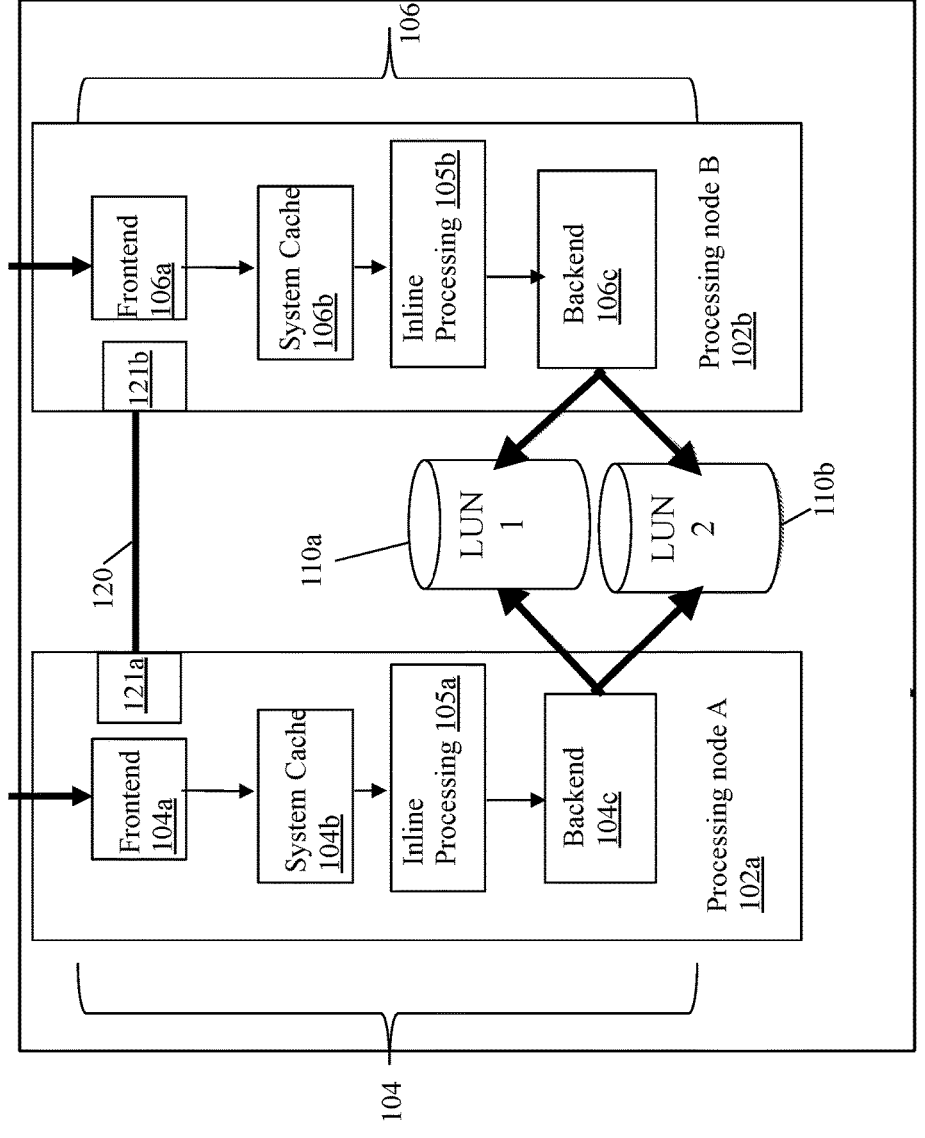
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*. In at least one embodiment, the interconnect 120 can be a network connection between a network interface 121*a* of node A and a network interface 121*b* of node B. The nodes 102*a-b* can communicate with one another over their respective network interfaces 121*a-b*. Generally, the network interfaces 121*a-b* can each include one or more network cards or adapters and/or other suitable components configured to facilitate communications between the nodes 102*a-b* over network interconnect 120.

In at least one embodiment, the network interfaces 121*a-b* can each include one or more suitable cards or adapters that support one or more of the following for communication between the nodes 102*a-b*: RDMA (Remote Direct Memory Access) over InfiniBand standard, RMDA over converged Ethernet (RoCE) standard, and/or RDMA over IP (e.g., Internet Wide-Area RDMA protocol or iWARP) standard.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair can receive and process I/O operations or commands, and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs. In at least one embodiment, a portion of each node's local volatile memory can also be used for caching information, such as blocks or pages of user data and metadata. For example, such node-local cached pages of user data and metadata can be used in connection with servicing reads for such user data and metadata.

The one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In at least one embodiment, a metadata (MD) structure of MD pages of mapping information can be used in accordance with the techniques herein. The mapping information can be used, for example, to map a logical address (e.g., user or storage client logical address), such as a LUN and an LBA or offset, to its corresponding storage location, such as a physical storage location on BE non-volatile PDs of the system. The mapping information can be used to map the logical address to the physical storage location containing the content or data stored at the logical address. In at least one embodiment, the mapping information includes a MD structure that is a hierarchical structure of multiple layers of MD pages or blocks.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. The tree structure of MD pages, corresponding to the mapping structure in at least one embodiment, can include only 3 levels where each node in the tree can have at most 3 child nodes. Generally, an embodiment can use any suitable structure or arrangement of MD pages comprising the mapping information.

In some contexts herein, a node which receives an I/O operation can be referred to as the initiator node with respect to that particular I/O operation. In some contexts herein, a node can also be referred to as an initiator with respect to initiating sending a message or request to a peer node, where the peer node can be referred to as a target with respect to the message or request. In response to receiving the message or request, the target node can perform processing to service the request or received message, and then send a reply, response or return message to the initiator.

In at least one embodiment, an architecture can be utilized which partitions ownership of the logical address space of user data or content among the multiple processing nodes of a system such as among the nodes A and B 102a-b of FIG. 2. Thus, each node can be the owner of a certain subset of user logical addresses. In at least one embodiment, a node assigned a particular logical address LA can be designated as the exclusive owner of the logical address LA. In at least one embodiment, mapping information can be used to map LA to a corresponding physical address or location PA including the content C1 of LA. The mapping information can include a chain of metadata (MD) pages traversed to determine the PA. In at least one embodiment, only the owner of the logical address LA can be allowed to perform mapping or address resolution processing for LA including traversing the chain of MD pages to determine LA's corresponding PA. If the node receives a read I/O directed to a logical address LA not owned by the node, the receiving node can issue a remote procedure call (RPC) to its peer node (that owns LA), where the owning peer node can then perform the mapping or address resolution processing for LA and return an address or pointer used to directly or indirectly access the content C1 of LA. In at least one embodiment, the RPC can also be referred to as a MAP RPC request from a non-owner node issued to the owner node that owns LA. In particular, the MAP RPC can be a request for the peer node (which owns the logical address LA) to perform mapping resolution processing for LA. The resolution processing can include mapping LA to a corresponding address or pointer used to directly or indirectly access C1. The resolution processing can be in accordance with the chain of MD pages of mapping information for LA. The resolution processing can include traversing MD pages of the chain of mapping information for LA. For example in one embodiment using the MD mapping structure noted above, the chain of MD pages can include a TOP MD page that references or points to a MID MD page, where the MID MD page references or points to a LEAF MD page, where the LEAF MD page references or points to a VLB (virtual layer block), and where the VLB includes the PA that references or points to the physical storage location of the content stored at the LA. In some embodiments, the address resolution processing performed as a result of the MAP RPC call can include traversing the chain of MD pages from the TOP to a corresponding LEAF MD page, where the MAP RPC response include returning an address or pointer to an entry E1 of a VLB, where E1 includes PA, a pointer or address to the content stored at the LA. In some embodiments, the address resolution processing performed as a result of the MAP RPC call can include traversing the chain of MD pages from the TOP to a corresponding VLB, where the MAP RPC response include returning PA, a pointer or address to the content stored at the LA.

If the initiator or receiving node which receives the read I/O operation to read C1 from LA is the owner of LA, the initiator node can perform all necessary resolution processing for LA1. In this case, the initiator node, which owns LA, does not need to issue an RPC to its peer node. Rather, any needed mapping or resolution processing for LA can be done locally on the owning initiator node that received the read I/O.

In at least one embodiment, the RPC request and corresponding RPC reply or response forming an RPC exchange can be communicated between the nodes 102a-b of FIG. 2 over the internode network connection 120 using the network interfaces 121a-b of the respective nodes 102a-b. In at least one embodiment, the RPC request can originate or be initiated by either of the nodes 102a-b in an active-active system. In the active-active system in one example, node A 102a can receive an I/O request such as a read I/O directed to an LA not owner by node A such that node A 102a is the initiator of the RPC call and node B 102b is the target or receiver of the RPC call received from node A 102a. In the active-active system in another example, node B 102b can receive an I/O request directed to an LA not owner by node B such as a read I/O such that node B 102b is the initiator of the RPC call and node A 102a is the target or receiver of the RPC call received from node B 102b.

Figure 3:
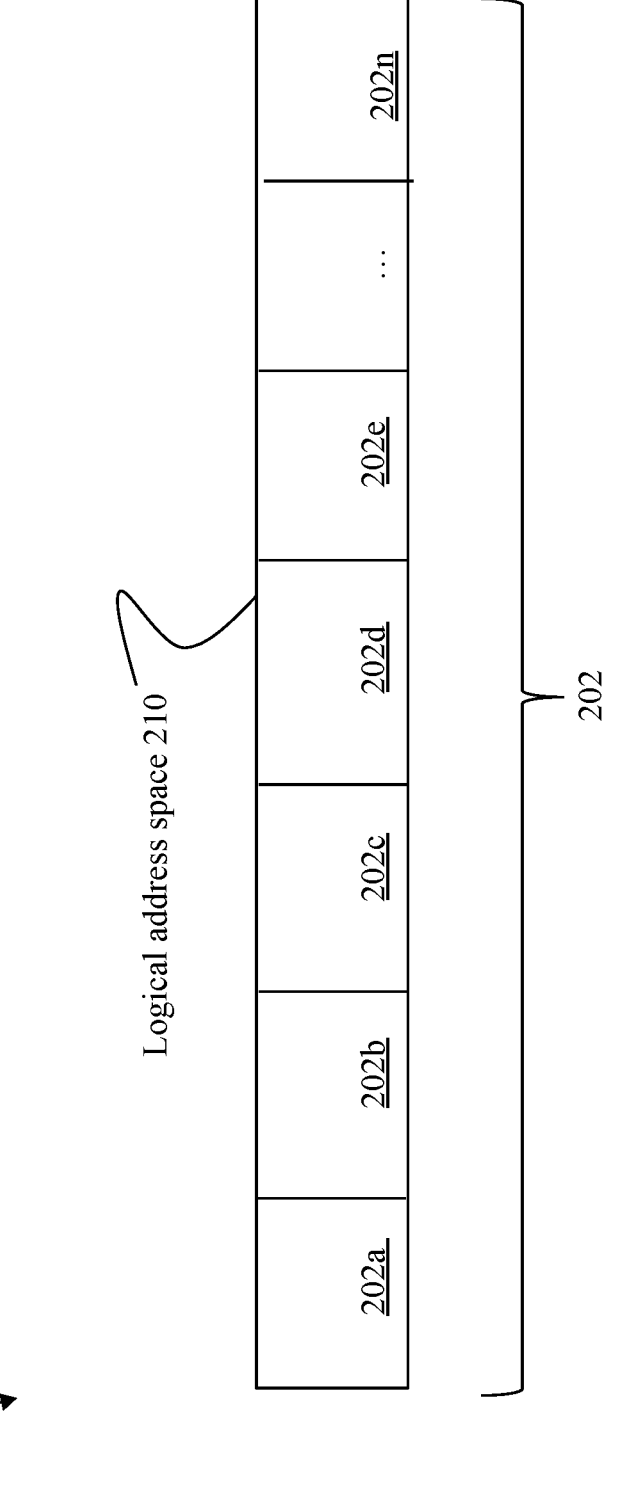
FIG. 3 is an example illustrating a partitioned logical address space in at least one embodiment in accordance with the techniques of the present disclosure.

In at least one embodiment in accordance with the techniques of the present disclosure and with reference to the example 200 of FIG. 3, the user data (UD) logical address space 210 can be partitioned into multiple portions 202, such as denoted by multiple logical address portions 202a-n. Each of the logical address portions 202a-n can be a same size, such as 2 MB (megabytes), or any other suitable size. The multiple address space portions 202a-n can then be divided among the two nodes in any suitable manner such that a first of the nodes, such as node A, is assigned exclusive ownership of a first set of the logical address portions and a second of the nodes, such as node B, is assigned exclusive ownership of a second set of logical address portions.

The logical address space 210 can denote an associated logical address space of any one or more storage objects or storage space. The one or more storage objects can include, for example, one or more volumes, logical devices or LUNs; one or more sub-LUN portions; and/or one or more file systems. Generally, the logical address space 210 can denote a contiguous range of consecutive logical addresses so that each of the logical address portions 202a-n is mapped to a unique subrange of consecutive logical addresses of the logical address space 210. For example, consider an embodiment where each of the portions 202a-n is 2 MB in size. In this case, the portion 202a can include all logical addresses x in the subrange $0 \leq x < 2$ MB; the portion 202b can include all logical addresses x in the subrange 2 MB $\leq x < 4$ MB; and so on.

The logical address portions 202 can be partitioned into two sets where each logical address portion is included in only one of the two sets. The logical address portions 202 can be partitioned equally or unequally between the two nodes A and B. For example, in at least one embodiment, the entire logical address range 210 can be divided equally in half, where node A is assigned the exclusive ownership of the portions of a first half of the address range 210, and where node B is assigned the exclusive ownership of the portions of the second half of the address range 210. As another example, the logical address portions 502 can be equally partitioned into two sets such as based on even or odd logical addresses. The first data set assigned to node A can include logical address portions having an associated starting logical address which is even; and the second data set assigned to node B can include logical address portions having an associated starting logical address which is odd.

In at least one embodiment, the logical address portions of the contiguous logical address range can alternate in connection with exclusive ownership assignment among the nodes A and B. For example, the first portion 202a can be assigned to node A, the second portion 202b can be assigned to node B, the third portion 202c can be assigned to node A, the fourth portion 204d can be assigned to node B, and so on. However more generally, ownership of the logical addresses of the logical address space 202 can be partitioned in any suitable manner among the nodes A and B in an embodiment in accordance with the techniques of the present disclosure.

Consider at least one embodiment of an active-active system with two nodes A and B each assigned ownership of certain logical addresses or slices or portions of logical addresses, where the logical addresses are partitioned equally or approximately so between the nodes A and B. Furthermore, let only the owning node of a logical address be allowed to performing mapping resolution processing. In such an embodiment, statistically about 50% of the I/O reads can require remote mapping where an initiator node that receives a read I/O directed to a logical address LA, and does not own LA, may send a MAP RPC request to its peer node that owns LA to perform any needed mapping or address resolution processing. Such address resolution processing for LA as performed by the owner peer node can include traversing the chain of MD pages of mapping information used to map LA to a physical address or location including the current content stored at LA.

In at least one embodiment, unlike other types of internode communications between nodes A and B, the MAP RPC request and RPC reply or response (e.g., RPC exchange) between the nodes can be an integral part of the synchronous I/O workflow processing and can therefore significantly and adversely impact end to end I/O latency.

In at least one embodiment, since RPC requests are an integral part of the latency sensitive synchronous I/O flow, it can be desirable to reduce the latency of the RPC requests and/or replies in connection with MAP RPCs to thereby reduce I/O latency and improve system performance.

Accordingly described in the following paragraphs are techniques that can be used to reduce the latency introduced by MAP RPC requests in at least one embodiment. More generally, the techniques of the present disclosure can be used to reduce the latency associated with critical or higher priority requests as compared to relatively lower priority requests. In at least one embodiment the critical or higher priority requests can include MAP RPC requests, or more generally, I/O latency sensitive requests or messages, such as those included in the synchronous I/O workflow for processing I/O operations of the data path.

Issuing RPCs between nodes in a system in at least one embodiment can generally be summarized as follows. A sender or initiator, such as node A, of the RPC or other request or message sends the request to a target such as node B. Once node B receives the request, node B can process the request, generate a reply and send the reply back to node A. One technique that can used with incoming messages or requests and replies is to have dedicated threads that block waiting for incoming requests or replies. However, the foregoing use of dedicated threads that block can be undesirable and unusable in a data storage system due to, for example, the large number of I/O requests and system resource constraints.

As an alternative to dedicated threads that block as noted above, polling can be used. For example, node A can periodically poll for a reply to its request. Also the target, receiver or receiving node, such as node B, can poll for incoming requests or messages. Some applications or services can use a cyclic buffer to account for messages in flight and for storing incoming received requests or replies. Polling can be used to check the cyclic buffer to see if any requests or replies are received by a node. In at least one embodiment in which nodes perform polling as noted above, latency of RPCs can be reduced by increasing the polling frequency performed by the nodes to check for incoming requests or replies. However, it may be that a large portion of the polling cycles can be idle or process only 1 or 2 new events (e.g., incoming requests or replies to be processed). In this case, the CPU cost of a polling cycle per event can be quite high. CPU resources can be a bottleneck in many scenarios so having such a high CPU cost can undesirably have an adverse impact on storage system performance.

Described in the following paragraphs are techniques that provide for reducing latency introduced by RPC requests, such as MAP RPC requests in at least one embodiment in which the RPC requests and associated replies are included in the synchronous I/O workflow of the data path. In such an embodiment using MAP RPC requests, end to end I/O latency can be improved in an active-active storage system in which both nodes A and B receive client I/Os such as from external hosts or other storage clients. In at least one such embodiment, each node is assigned ownership of slices or portions of the user logical address space, and where only the owner node of a logical address performs address resolution or mapping using mapping information such as a chain of MD pages. In at least one embodiment, completion queues (CQs) can be used to manage, report and signal completed receipt of incoming requests or messages on a node. When an incoming message is received by a node, a corresponding entry E1 (sometimes referred to as a work queue entry or WQE)) can be included in a receive queue (RQ) of the node having an associated CQ on the node. E1 of RQ can be associated with the incoming received message. Additionally, processing can associate an entry E2 (sometimes referred to as a CQ entry or CQE) of the CQ with the incoming message and corresponding entry E1 of the RQ, where E2 can indicate that the incoming message associated with E1 of RQ needs to be processed, serviced or handled. In at least one embodiment, a poller thread executing on the node can then periodically poll the CQ for filled or completed CQ entries, such as the CQE (CQ entry) E2 associated with a newly received and unprocessed message, where the CQE E2 can then be forwarded to an application or service thread for subsequent processing and handling.

In at least one embodiment, the techniques of the present disclosure can use multiple pollers including two separate pollers or two separate polling threads. In at least one embodiment, a first poller is a non-critical or normal poller that polls CQs associated with non-critical messages having a normal or non-critical polling priority; and a second poller is a critical poller that polls one or more CQs associated with critical messages having a critical or elevated polling priority relative to the non-critical polling priority. In at least one embodiment, the critical poller can be called more frequently than the non-critical poller where the critical polling frequency is thus greater than the non-critical polling frequency. In at least one embodiment, one or more CQs associated with MAP RPC requests can be assigned the critical polling priority with remaining lower priority CQs assigned the non-critical or normal polling priority. In at least one embodiment, the number of non-critical polling priority CQs is expected to be much larger than the number of critical polling priority CQs. Additionally, in at least one embodiment, the maximum allowable number of concurrent entries in a critical polling priority CQ can be less than the maximum allowable number of concurrent entries in a non-critical polling priority CQ. Accordingly, in at least one embodiment, although the critical polling frequency of critical CQs is greater than the polling frequency of non-critical CQs, the CPU cost associated with a single critical polling cycle is expected to be negligible and relatively small in comparison to the CPU cost associated with a single non-critical polling cycle.

In at least one embodiment, each non-critical polling cycle can include traversing all non-critical CQs to check for any newly received non-critical priority messages; and each critical polling cycle can include traversing all critical CQs to check for any newly received critical priority messages. In at least one embodiment, each CQ can be implemented as an array or other suitable structure of entries so that: traversing all non-critical CQs in a single non-critical polling cycle can include checking each entry of each non-critical CQ to see if the entry is associated with a newly received and unprocessed non-critical priority message; and traversing all critical CQs in a single critical polling cycle can include checking each entry of each critical CQ to see if the entry is associated with a newly received and unprocessed critical priority message. In the event that any entry of a CQ is associated with an newly received message, the message can be forwarded, such as by a polling thread, to another thread, such as an application thread of a client service or application, for further handling.

In at least one embodiment, there can be multiple client services where each client service has its own separate set of one or more CQs, or more generally each client service has its own separate set of queues that can include one or more CQs and one or more other queues. In at least one embodiment, the other queues can include one or more RQs of a node configured for storing received messages received by the node and/or send queues (SQs) configured for storing messages to be sent from the node. In at least one embodiment where each node in the system includes multiple processing cores (e.g., each node includes one or more multicore CPUs), each core can include a set of CQs, or more generally a set of queues, for each client service. Thus, for example, consider a system in which a node includes N cores and M client services used in connection with the techniques of the present disclosure. There can be M sets of CQs for the M services. Additionally, each of the N cores can include a separate instance of M sets of CQs for the M services (e.g., there can be M×N sets of CQs for a node with M services and N cores). In at least one embodiment, each core can include its own core-specific set of CQ pollers (e.g., there can be a separate set of two pollers for each core). For example, there can be a core-specific non-critical poller and a core-specific critical poller for each core, where the core specific non-critical poller for a core C1 polls all non-critical CQs of core C1 in each non-critical polling cycle, and where the core specific critical poller for C1 polls all critical CQs of core C1 in each critical polling cycle.

In at least one embodiment, nodes A and B can communicate using RPC requests and replies using Remote Direct Memory Access (RDMA). When using RDMA in at least one embodiment, RDMA CQs, receive queues (RQs), and send queues (SQs) can be used. A first SQ of a local node can include work queue elements (WQEs) corresponding to RPC requests to be sent to another remote node. A second SQ of a local node can include work queue elements (WQEs) corresponding to RPC replies or responses to be sent to another remote node. A first RQ of a local node can include WQEs corresponding to incoming RPC requests that have been received from a remote node and need to be processed or handled by the local node. A second RQ of a local node can include WQEs corresponding to RPC replies received from a remote node in response to corresponding RPC requests previously sent from the local node to the remote node.

In at least one embodiment, node A can be an initiator node that initiates or sends an RPC request using RDMA to node B as a target node. Node B can receive the RPC request, perform processing to service the RPC request, and then return an RPC reply or response to node A using RDMA. In at least one embodiment, the initiator node, such as node A, can create a WQE of an RDMA SQ of node A where the WQE of the SQ corresponds to (or is associated with) the RPC request to send to node B. Each WQE of the SQ of node A can be associated with a buffer in node A's memory where the buffer can store content of the message to be sent via RDMA by node A. On node A, a first CQ can be associated with an incoming reply queue implemented as a first RQ of WQEs associated with received RPC replies having associated content stored in node A's memory. The first CQ can be configured to report or signal completed receipt of received RPC replies. The first CQ can be polled periodically by node A for notification regarding received RPC replies. The foregoing SQ of node A and the foregoing first RQ of node A can be included in a configured RDMA queue pair (QP), a first QP1, on node A, where the first CQ can be configured to signal receipt of incoming messages received by node A where the incoming messages are associated with WQEs of the first RQ.

On the target node B, a second CQ can be associated with an incoming request queue implemented as a second RQ of WQEs associated with received RPC requests. The second CQ can be configured to report or signal completed receipt of received RPC requests. The second CQ can be polled periodically by node B for notification regarding received RPC requests (from node A) to be processed. In response to node A creating the WQE in its SQ for the RPC request, RDMA can be used to send the RPC request to node B. Content of the RPC request can be stored using RDMA in a previously allocated buffer in the memory of node B, where the buffer is associated with (e.g., pointed to or referenced by) a previously prepared WQE of the second RQ of node B. Once node B processes an RPC request received from node A, node B can generate an RPC reply or response associated with a second WQE of a second SQ on node B. Using RDMA, node B can send the RPC reply or response to node A where the RPC reply or response can be stored in a previously allocated buffer in the memory of node A, where the buffer is associated with (e.g., pointed to or referenced by) a previously prepared WQE of the first RQ of node A. The foregoing second SQ of node B and the foregoing second RQ of node B can be included in a configured RDMA QP, a second QP2, on node B, where the second CQ can be configured to signal receipt of incoming messages received by node B where the incoming messages are associated with WQEs of the second RQ. In at least one embodiment, processing can be performed in a registration or preprocessing phase in accordance with RDMA to establish a connection between the QP1 and QP2, and queues thereof, prior to sending or receiving any messages between the nodes A and B in accordance with RDMA.

In at least one embodiment, for a receive WQE of an RQ associated with a CQ, the CQ is configured to generate a completion signal in response to hardware, such as a network interface of a node configured for RDMA, receiving a message, and then writing or storing the message in a buffer referenced by or associated with a previously prepared receive WQE of the RQ. In at least one embodiment, the receive WQE of the RQ can point to the buffer within the node's memory where content of the message is stored in the buffer of the receiving node's memory.

In at least one embodiment, RDMA can be used to generally send messages, such as the RPC requests or replies, associated with WQEs of a local node's RDMA SQ to a remote node. When a message is received at the remote node, the received message can be stored directly in a previously allocated buffer in the memory of the remote node. Additionally, a previously prepared WQE X1 of an RQ on the remote node can be associated with the buffer storing the received message; and a CQE X2 of a CQ associated with the RQ can be updated to signal or indicate that the corresponding WQE X1 references an incoming associated message that needs to be processed or handled by the remote node.

In at least one embodiment, CQs of a node can be partitioned into a first portion assigned a critical polling priority and into a second portion assigned a non-critical or normal polling priority. In at least one embodiment, CQs assigned the critical polling priority of the first portion can be polled, at a critical polling frequency, each critical polling cycle by a dedicated critical priority polling thread. In at least one embodiment, CQs assigned the non-critical polling priority of the second portion can be polled, at a non-critical polling frequency, each non-critical polling cycle by a dedicated non-critical polling priority thread. In at least one embodiment, multiple RDMA connections can be established between respectively paired QPs, where each pair of QPs includes a first QP1 on node A and a second QP2 on node B. In at least one embodiment, one or more CQs such as associated with a pair of QPs can be assigned either a critical polling priority or a non-critical polling priority. In at least one embodiment, each individual client service included in a set of multiple client services available on a system can be assigned either a critical polling priority or a non-critical polling priority. In at least one embodiment, each individual client service of the set can be configured to send and receive messages between nodes of the system in accordance with RDMA where CQs associated with the client service on a node are polled in accordance with client service's respective assigned polling priority that is one of non-critical polling priority or critical polling priority. In at least one embodiment, RPC requests and replies, such as those related to MAP RPCs included in the data path or I/O path and associated I/O workflow, can be associated with at least a first client service that is assigned a critical polling priority. Additionally, in at least one embodiment, other messages can sent in connection with one or more other client services assigned a non-critical or normal polling priority.

In at least one embodiment, the number of CQs in the critical CQ list associated with critical polling priority services can be expected to be less than the number of CQs in the non-critical list associated with non-critical polling priority services. In at least one embodiment, the number of client services assigned the normal non-critical polling priority can be greater than the number of one or more client services assigned the critical polling priority.

The foregoing and other aspects of the techniques of the present disclosure are described in more detail in the following paragraphs.

Consistent with other discussion herein, RDMA is the direct access of memory of one computer or node by another in a network without involving either one's operating system, processor or cache. Thus RDMA enables two networked systems or nodes to exchange data in main memory without relying on the processor, cache or operating system of either node or computer. RDMA is a hardware mechanism through which the network adapter, interface or circuitry can directly access all or parts of the main memory of a node without involving the node's CPU or operating system. Use of RDMA can thus result in improved throughput and performance of systems.

RDMA facilitates more direct and efficient data movement into and out of a node or computer by implementing a transport protocol in a network interface card (NIC) or adapter located on each communicating device. For example in at least one embodiment, two networked nodes A and B 102-*b* can each be configured with a NIC that supports the RDMA over Converged Ethernet (ROCE) protocol, enabling the nodes to carry out RoCE-based communications. Thus, RDMA operates by using a network adapter, interface or circuitry such as a NIC that supports RDMA. These NICs have specialized hardware that allows them to directly access the memory of the system or node they are connected to, without the need for involvement of the CPU of the node or system. When a first node or system wants to transfer data using RDMA to a second node or system, the first node or system sends a request to the first node's local NIC, which then uses the specialized hardware of the local NIC to transfer the data directly to the memory of the other second node or system.

RDMA supports "zero-copy" networking by enabling the NIC, or more generally the network adapter, interface or circuitry, to transfer data received over a network connection directly to application memory, or from application memory directly to the network connection. The foregoing eliminates the need to copy data between application memory and the data buffers in the operating system. Such transfers require no work to be done by CPUs, caches, or context switches, and transfers continue in parallel with other system operations. This reduces latency in message transfer. "Zero-copy" describes operations in which the CPU does not perform the task of copying data from one memory area to another or in which unnecessary data copies are avoided. This is frequently used to save CPU cycles and memory bandwidth in many time consuming tasks and improve performance.

In at least one embodiment with reference back to FIG. 2, the network interfaces 121*a-b* can each be a NIC with network interface circuitry that supports one or more of the following: RDMA over InfiniBand standard, RMDA over converged Ethernet (RoCE) standard, and/or RDMA over IP (e.g., Internet Wide-Area RDMA protocol or iWARP) standard.

Before describing use of a critical poller and a non-critical poller as noted above and elsewhere herein in connection with the techniques of the present disclosure, further details are first described with reference to various RDMA structures that can be used in at least one embodiment in accordance with the techniques of the present disclosure.

The following paragraphs make reference to an embodiment in which the techniques of the present disclosure use RDMA for internode communication. More generally, the techniques of the present disclosure can be used in embodiments that may use other communication protocols besides RDMA for communication between nodes, systems, devices or other suitable components configured for communication therebetween. Additionally, the following paragraphs illustrate a message exchange where the message sent is an RPC request, such as a MAP RPC request, and where the return, response or reply message is an RPC response such as a MAP RPC reply or response. More generally, the techniques can be used with any suitable message exchange for any suitable purpose where an initiator system, device or node sends a work request to target system, device or node to perform work, and where the target system, device or node can then return a reply to the initiator. In some embodiments, the reply can include requested content or results generated or determined as a result of processing performed by the target based, at least in part, on the work request previously received from the initiator. The following paragraphs describe at least one embodiment that categorizes the MAP RPC request and reply/response as having a critical or elevated priority relative to other messages or requests. More generally, an embodiment can characterize other types of messages as having critical or elevated priority, and thus a critical elevated polling priority relative to other lower priority non-critical messages.

Figure 4:
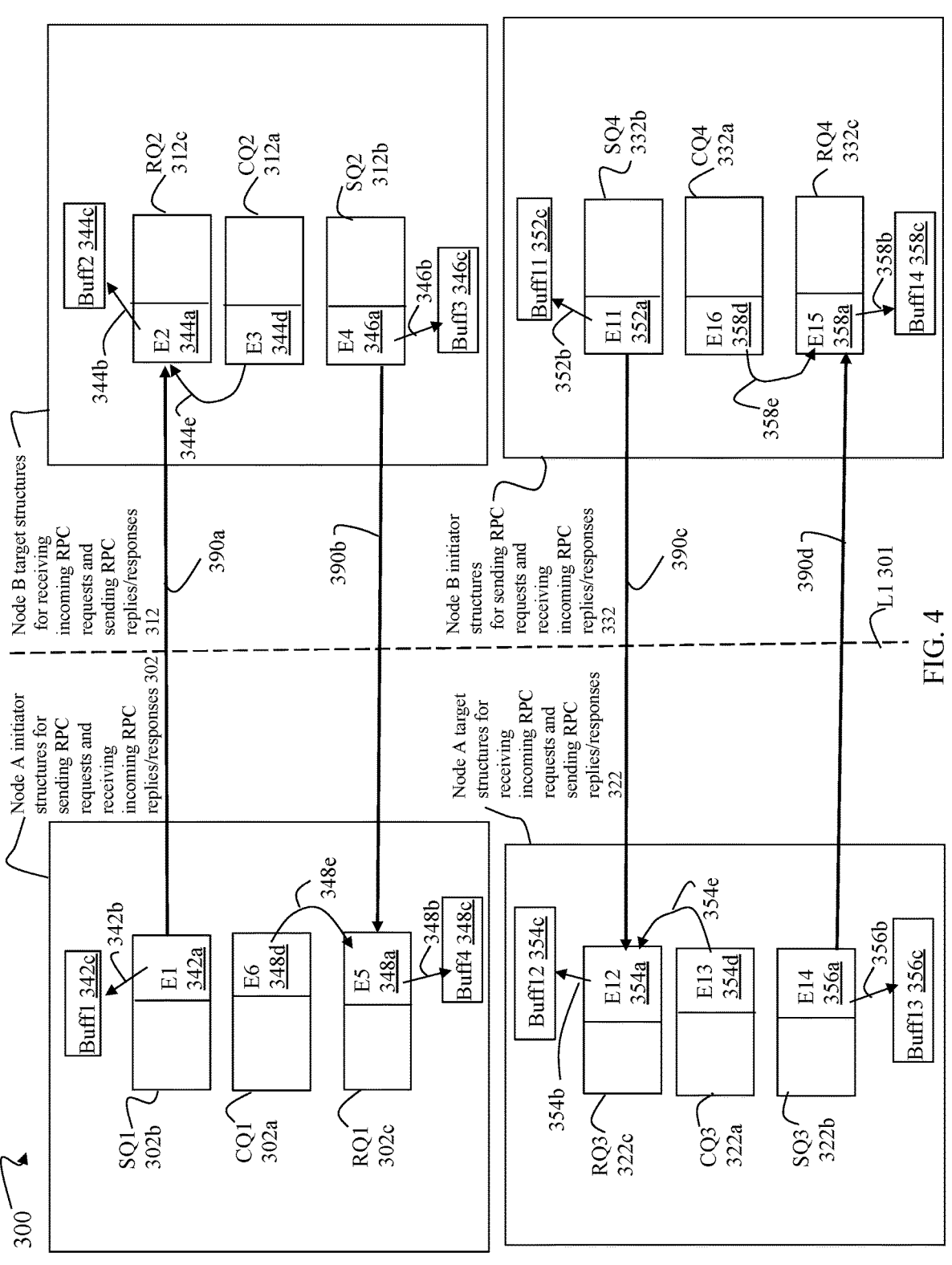
FIGS. 4, 5, 6 and 7 are examples illustrating structures and components that can be included in embodiments in accordance with the techniques of the present disclosure.

Referring to FIG. 4, shown is an example 400 of various structures that can be used in at least one embodiment in accordance with the techniques of the present disclosure for a single service, such as a single client service.

Elements to the left of the dashed line L1 301 can be included in a first node, such as node A 102*a* of FIG. 2, and elements to the right of the dashed line L1 301 can be included in a second node, such as node B 102*b* of FIG. 2. The nodes A and B 102*a-b* can be configured to communicate using RDMA using the network interfaces 121*a-b* (not shown in FIG. 4 for simplicity).

In this example with an active-active system, both nodes A and B can receive I/Os such that both nodes A and B can be an initiator with respect to I/Os and associated RPC requests issued to the other peer node. Consistent with discussion herein, the RPC request such as the MAP RPC request can be issued by the initiator node to the target node when the initiator node receives an I/O operation, such as a read I/O operation, directed to a target logical address LA not owned by the receiving initiator node. In a similar manner, both nodes A and B can be a target with respect to RPC requests received from the other peer node.

The target node owning the LA can receive the RPC request from the non-owner node, perform processing to service the RPC request, and then return an RPC response to the initiator node.

Element 302 illustrates structures used by node A in scenarios where node A is the initiator with respect to an RPC request. In particular element 302 includes initiator structures for sending RPC requests to node B and receiving corresponding incoming RPC replies or responses from the peer node B.

Element 322 illustrates structures used by node A in scenarios where node A is the target or recipient of an RPC request. In particular element 322 includes target structures for receiving incoming RPC requests from node B and sending corresponding RPC replies or responses to the peer node B.

Element 312 illustrates structures used by node B in scenarios where node B is the target or recipient of an RPC request. In particular element 312 includes target structures for receiving incoming RPC requests from node A and sending corresponding RPC replies or responses to the peer node A.

Element 332 illustrates structures used by node B in scenarios where node B is the initiator with respect to an RPC request. In particular element 322 includes initiator structures for sending RPC requests to node A and receiving corresponding incoming RPC replies or responses from the peer node A.

The various structures of 302 and 322 can be configured in the node local memory of node A. The various structures of 312 and 332 can be configured in the node local memory of node B. In at least one embodiment where the nodes A and B each include multiple cores, the various structures of 302 and 322 can be dedicated for use by a single core and configured in a core-specific memory portion of the node local memory of node A; and the various structures of 312 and 332 can be dedicated for use by a single core and configured in a core-specific memory portion of the node local memory of node B.

In at least one embodiment, RDMA communications can be based on hardware aware queues including an SQ, an RQ and a CQ. SQs and RQs can be characterized as work queues, where a single SQ and a single RQ can be configured as a queue pair (QP) on a node. A CQ can be used to provide notification when work has been completed. More specifically in at least one embodiment, a dedicated CQ can be associated with a single RQ where the CQ is configured to report completed receipt of incoming messages associated with the single RQ. In at least one embodiment in accordance with the techniques of the present disclosure, the CQ can be assigned a polling priority that is one of a critical polling priority or a non-critical normal polling priority. In one aspect, the foregoing set of hardware aware queues (SQ, RQ and CQ) on a node can be characterized as interfaces between an application executing on the node and the node's local NIC or network interface for performing RDMA operations. Each SQ and RQ can include WQEs. Each WQE of an SQ can point to or reference an associated buffer including a message or content to be sent, where the buffer is located in a node's memory. Each WQE of an RQ can point to or reference an incoming message, or more specifically, points to or references a buffer where an incoming received message is placed, where the buffer is located in a node's memory.

Consider a first scenario with reference to the elements 302 and 312 of FIG. 4, where node A is the initiator and node B is the target with respect to an RPC request. Node A can include a set of queues of 302 including CQ1 302a, and a queue pair QP1 configured from SQ1 302b and RQ1 302c. CQ1 302a can be a dedicated CQ associated with a single queue, RQ1 302c. In this manner in at least one embodiment, CQ1 302a can be configured to report completed receipt of incoming messages associated with only the single RQ1 302c. Node B can include a set of queues of 312 including CQ2 312a, and a queue pair QP2 configured from SQ2 312b and RQ2 312c. CQ2 312a can be a dedicated CQ and associated with a single queue, RQ2 312c. In this manner in at least one embodiment, CQ2 312a can be configured to report completed receipt of incoming messages associated with only the single RQ2 312c.

A connection can be configured and established between QP1 of node A and QP2 of node B such that SQ1 302b and RQ2 312c are configured in a pairing relationship 390a; and such that SQ2 312b and RQ1 302c are configured in a pairing relationship 390b.

In particular SQ1 302b of node A and RQ2 312c of node B can be configured in the pairing relationship 390a in accordance with RDMA causing SQ1 302b to synchronize with RQ2 312c such that RDMA is used to send a message (e.g., RPC request stored in a buffer of node A's memory) that is associated with a WQE of SQ1 302b to node B. At node B, the received message is stored in a previously allocated buffer (of node B's memory) that is associated with a previously prepared WQE of RQ2 312c. Once the received message is stored on node B in the buffer associated with the WQE of RQ2 312c, a corresponding CQE of CQ2 312a can be updated to signal or indicate completed receipt of the message by node B.

Processing performed prior to node A sending an RPC request or message to node B can include node A allocating a buffer buff4 348c (in the memory of node A) to be used as an empty buffer for receiving and storing a subsequent RPC reply or response message from node B. Node A can generate WQE E5 348a that is associated with the buffer 348c such that E5 348a describes or references (e.g., points to 348b) the buffer 348c. WQE E5 348a can be enqueued (e.g., stored or placed) in RQ1 302c. More generally, node A can repeatedly perform the foregoing to prepare multiple WQEs of RQ1 302c for the arrival of multiple corresponding RPC replies or messages from node B.

Node B can perform processing prior to node A sending the RPC request or message to node B. In particular, node B can allocate buffer buff2 344c (located in node B's memory) to be used as an empty buffer for receiving and storing the RPC request message received from node A. Node B can generate WQE E2 344a that is associated with buffer 344c such that E2 344a describes or references (e.g., points to 344b) the buffer 344c. WQE E2 344a can be enqueued in RQ2 312c. More generally, node B can repeatedly perform the foregoing to prepare multiple WQEs of RQ2 312c for the arrival of multiple corresponding RPC requests or messages from node A.

After WQE E5 is stored in RQ1 302c and after WQE E2 is stored in RQ2 312c, node A can perform processing to send the RPC request or message to node B. In particular, node A can allocate the buffer buff1 342c to store the content of the RPC request or message to be sent to node B. Node A can generate the WQE E1 342a that is associated with the buffer 342c such that E1 342a describes or references (e.g., points to 342b) the buffer 342c. WQE E1 342a can be enqueued (e.g., stored on placed) in SQ1 302b. Placing E1 342a on the SQ1 302b of the network interface or adapter 121a of node A causes an asynchronous RDMA transfer of the RPC request stored in buff1 342c to node B. Once the WQE E1 342a is stored in SQ1 302b, control returns to the issuing thread, application or service. Subsequently, polling can be performed to poll CQ1 302a to poll for an RPC reply message sent by node B in response to the transferred RPC request just sent via RDMA.

With reference back to FIG. 2 and also with reference to FIG. 4, placing E1 342a on the SQ1 302b of the network interface or adapter 121a of node A causes an asynchronous RDMA transfer of the RPC request stored in buff1 342c to node B. In particular, the pairing relationship 390a between SQ1 302b and RQ2 312c in accordance with RDMA causes SQ1 302b to be synchronized with RQ2 312c by sending the contents (e.g., the RPC request) of the buffer 342c over the internode network connection 120 to node B. At node B, the received contents or RPC request is stored by the network interface or adapter 121b of node B via RDMA in an allocated buffer associated with a prepared WQE of RQ2 312c. In this example, the received RPC request or message received by node B can be stored via RDMA in buff2 344c associated with WQE E2 344a of RQ2 312c. Additionally, in response to the received RPC request or message being stored in the buffer 344c, a CQE E3 344d of CQ2 312a can be associated with, reference, or point to (344e) WQE E2 344a, where E2 344a further references, points to or is associated with the buffer 344c. In this manner, CQE E3 344d now associated with E2 344a of RQ2 312c can serve as a signal, indicator or notification that there is a newly received message (RPC request) from node A that needs to be processed. Consistent with discussion elsewhere herein, a poller, such as a polling thread executing on node B, can periodically poll CQ2 312a and CQ4 332a (discussed elsewhere herein) for CQEs (such as CQE E3 344d) associated with received messages (such as the received RPC request stored in buffer 344c) that need to be processed. In this case, the CQ2 312a can respond to the polling thread by sending CQE 344d back to the polling thread which can then forward the CQE 344d to an application or service thread of node B for processing. In particular, the application or service thread of node B can perform processing to service the RPC request stored in the buffer 344c. The application or service thread of node B can access the RPC request of the buffer 344c through references or pointers 344e and 344b.

Once the application or service thread of node B has completed processing the RPC request of the buffer 344c, node B can create an RPC reply based on the processing of the RPC request. In particular, to send the RPC reply in this example, node B allocates the buffer 346c (reply buffer 346c), stores data of the RPC reply (return or reply message) in the buffer 346c, and generates a WQE E4 346a that describes, references or points to, the buffer 346c. WQE E4 346a can be enqueued (e.g., stored on placed) in SQ2 312b. Placing E4 346a on the SQ2 312b of the network interface or adapter 121b of node B causes an asynchronous RDMA transfer of the RPC reply message that is stored in the buffer 346c to node A.

With reference back to FIG. 2 and also with reference to FIG. 4, placing E4 346a on the SQ2 312b of the network interface or adapter 121b of node B in accordance with RDMA causes an asynchronous RDMA transfer of the RPC reply message (e.g., content) stored in buff3 346c to node A. In particular, the pairing relationship 390b between SQ2 312b and RQ1 302c in accordance with RDMA causes SQ1 312b to be synchronized with RQ1 302c by sending the contents (e.g., the RPC reply) of the buffer 346c over the internode network connection 120 to node A. At node A, the received contents of the RPC reply is stored by the network interface or adapter 121A of node A via RDMA in an allocated buffer associated with a prepared WQE of RQ1 302c. In this example, the received RPC reply received by node B can be stored via RDMA in the previously allocated buffer buff4 348c associated with the WQE E5 348a of RQ1 302c. Additionally, in response to the received RPC reply message being stored in the buffer 348c, a CQE E6 348d of C12 302a can be associated with, reference, or point to (348e) WQE E5 348a, where E5 348a further references, points to or is associated with (348b) the buffer 348c. In this manner, CQE E6 348d now associated with E5 348a of RQ1 302c can serve as a signal, indicator or notification that there is a newly received message (RPC reply) from node B that needs to be processed. Consistent with discussion elsewhere herein, a poller, such as a polling thread executing on node A, can periodically poll CQ1 302a and CQ3 322a (discussed elsewhere herein) for CQEs (such as CQE E6 348d) associated with received messages (such as the received RPC reply stored in buffer 348c) that need to be processed. In this case, the CQ1 302a can respond to the polling thread by sending CQE E6 348d back to the polling thread which can then forward the CQE E6 348d to an application or service thread for processing. In particular, the application or service thread can perform processing to handle or further use information received in the RPC response as stored in the buffer 348c. The application or service thread can access content of the RPC reply of the buffer 348c through references or pointers 348e and 348b.

Consider a second scenario with reference to the elements 322 and 332 of FIG. 4, where node B is the initiator and node A is the target with respect to an RPC request. Node A can include a set of queues of 322 including CQ3 322a, and a QP3 of SQ3 322b and RQ3 322c. CQ3 322a can be a dedicated CQ and associated with a single queue, RQ3 322c. In this manner in at least one embodiment, CQ3 322a can be configured to report completed receipt of incoming messages associated with only the single RQ3 322c. Node B can include a set of queues of 332 including CQ4 342a, and a QP4 of SQ4 332b and RQ4 332c. CQ4 332a can be a dedicated CQ and associated with a single queue, RQ4 332c. In this manner in at least one embodiment, CQ4 332a can be configured to report completed receipt of incoming messages associated with only the single RQ4 332c.

In particular SQ4 332b of node B and RQ3 322c of node A can be configured in the pairing relationship 390d in accordance with RDMA causing SQ4 332b to synchronize with RQ3 322c such that RDMA is used to send a message (e.g., RPC request) associated with a WQE of SQ4 332b from node B to node A. At node A, the received message is stored in a previously allocated buffer associated with a previously prepared WQE of RQ3 322c. Once the received message is stored on node A in the buffer associated with the WQE of RQ3 322c, a corresponding CQE of CQ3 322a can be updated to signal or indicate completed receipt of the message by node B.

Processing performed prior to node B sending an RPC request or message to node A can include node B allocating a buffer buff14 358c to be used as an empty buffer for receiving and storing a subsequent RPC reply or response message from node A. Node B can generate WQE E15 358a that is associated with the buffer 358c such that E15 358a describes or references (e.g., points to) 358b the buffer 358c. WQE E15 358a can be enqueued (e.g., stored or placed) in RQ4 332c. More generally, node B can repeatedly perform the foregoing to prepare multiple WQEs of RQ4 332c for the arrival of multiple corresponding RPC replies or messages from node A.

Node A can perform processing prior to node B sending the RPC request or message to node B. In particular, node A can allocate buffer buff12 354c to be used as an empty buffer for receiving and storing the RPC request message received from node B. Node A can generate WQE E12 354a that is associated with buffer 354c such that E12 354a describes or references (e.g., points to) 354b the buffer 354c. WQE E12 354a can be enqueued in RQ3 322c. More generally, node A can repeatedly perform the foregoing to prepare multiple WQEs of RQ3 322c for the arrival of multiple corresponding RPC requests or messages from node B.

After WQE E15 358a is stored in RQ4 332c and after WQE E12 is stored in RQ2 322c, node B can perform processing to send the RPC request or message to node A. In particular, node B can allocate the buffer buff11 352c to hold the RPC request or message to be sent to node A. Node B can generate the WQE E11 352a that is associated with the buffer 352c such that E11 352a describes or references (e.g., points to 352b) the buffer 352c. WQE E11 352a can be enqueued (e.g., stored on placed) in SQ4 332b. Placing E11 352a on the SQ4 332b of the network interface or adapter 121b of node B in accordance with RDMA causes an asynchronous RDMA transfer of the RPC request stored in buff11 352c to node A. Once the WQE E11 352a is stored in SQ4 332b, control returns to the issuing thread, application or service. Subsequently, polling can be performed to poll CQ4 332a for an RPC reply message sent by node A in response to the transferred RPC request just sent via RDMA.

With reference back to FIG. 2 and also with reference to FIG. 4, placing E11 352a on the SQ4 332b of the network interface or adapter 121b of node B in accordance with RDMA causes an asynchronous RDMA transfer of the RPC request stored in buff11 352c to node A. In particular, the pairing relationship 390c between SQ4 332b and RQ3 322c in accordance with RDMA causes SQ4 332b to be synchronized with RQ3 322c by sending the contents (e.g., the RPC request) of the buffer 352c over the internode network connection 120 to node A. At node A, the received contents or RPC request is stored by the network interface or adapter 121a of node A via RDMA in an allocated buffer associated with a prepared WQE of RQ3 322c. In this example, the received RPC request or message received by node A can be stored via RDMA in buff12 354c associated with WQE E12 354a of RQ3 322c. Additionally, in response to the received RPC request or message being stored in the buffer 354c, a CQE E13 354d of CQ3 322a can be associated with, reference, or point to (354e) WQE E12 354a, where E12 354a further references, points to or is associated with the buffer 354c. In this manner, CQE E13 354d now associated with E12 354a of RQ3 322c can serve as a signal, indicator or notification that there is a newly received message (RPC request) from node B that needs to be processed. Consistent with discussion elsewhere herein, a poller, such as a polling thread executing on node B, can periodically poll CQ1 302a and CQ3 322a (discussed elsewhere herein) for CQEs (such as CQE E13 354d) associated with received messages (such as the received RPC request stored in buffer 354c) that need to be processed. In this case, the CQ3 322a can respond to the polling thread by sending CQE 354d back to the polling thread which can then forward the CQE E13 354d to an application or service thread of node A for processing. In particular, the application or service thread of node A can perform processing to service the RPC request stored in the buffer 354c. The application or service thread of node A can access the RPC request of the buffer 354c through references or pointers 354e and 354b.

Once the application or service thread of node A has completed processing the RPC request of the buffer 354c, node A can create an RPC reply based on the processing of the RPC request. In particular, to send the RPC reply in this example, node A allocates the buffer 356c (reply buffer 356c), stores data of the RPC reply (return or reply message) in the buffer 356c, and generates a WQE E14 356a that describes, references or points to (356b), the buffer 356c. WQE E14 356a can be enqueued (e.g., stored on placed) in SQ3 322b. Placing E14 356a on the SQ3 322b of the network interface or adapter 121a of node A causes an asynchronous RDMA transfer of the RPC reply message that is stored in the buffer 356c to node B.

With reference back to FIG. 2 and also with reference to FIG. 4, placing E14 356a on the SQ3 322b of the network interface or adapter 121a of node A causes an asynchronous RDMA transfer of the RPC reply message (e.g., content) stored in buff13 356c to node B. In particular, the pairing relationship 390d between SQ3 332b and RQ4 322c in accordance with RDMA causes SQ3 322b to be synchronized with RQ4 332c by sending the contents (e.g., the RPC reply) of the buffer 356c over the internode network connection 120 to node B. At node B, the received contents or RPC reply is stored by the network interface or adapter 121b of node B via RDMA in an allocated buffer associated with a prepared WQE of RQ4 332c. In this example, the received RPC reply received by node A can be stored via RDMA in the previously allocated buffer buff14 358c associated with the WQE E15 358a of RQ4 332c. Additionally, in response to the received RPC reply message being stored in the buffer 358c on node B, a CQE E16 358d of CQ4 332a can be associated with, reference, or point to (358e) WQE E15 358a, where E15 358a further references, points to or is associated with (358b) the buffer 358c. In this manner, CQE E16 358d now associated (358e) with E15 358a of RQ1 302c can serve as a signal, indicator or notification to node B that there is a newly received message (RPC reply) from node A that needs to be processed. Consistent with discussion elsewhere herein, a poller, such as a polling thread executing on node B, can periodically poll CQ2 312a and CQ4 332a (discussed elsewhere herein) for CQEs (such as CQE E16 358d) associated with received messages (such as the received RPC reply stored in buffer 358c) that need to be processed. In this case, the CQ4 332a can respond to the polling thread by sending CQE E16 358d back to the polling thread which can then forward the CQE E16 358d to an application or service thread executing on node B for processing. In particular, the application or service thread of node B can perform processing to handle or further use information received in the RPC response as stored in the buffer 358c. The application or service thread of node B can access content of the RPC reply of the buffer 358c through references or pointers 358e and 358b.

In at least one embodiment, the various structures of the example 300 of FIG. 4 can be configured for use with a single client service on a data storage system including the nodes A and B where node A can be an initiator of a request sent to the target node B, and where node B can be an initiator of a request sent to the target node A. Thus in at least one embodiment, node A can be both an initiator and a target such as with respect to MAP RPC requests; and node B can be both an initiator and a target with respect to MAP RPC requests. In such an embodiment as illustrated in the example 300 of FIG. 4, the 4 sets of queues 302, 312, 322 and 332 can be utilized.

Figure 5:
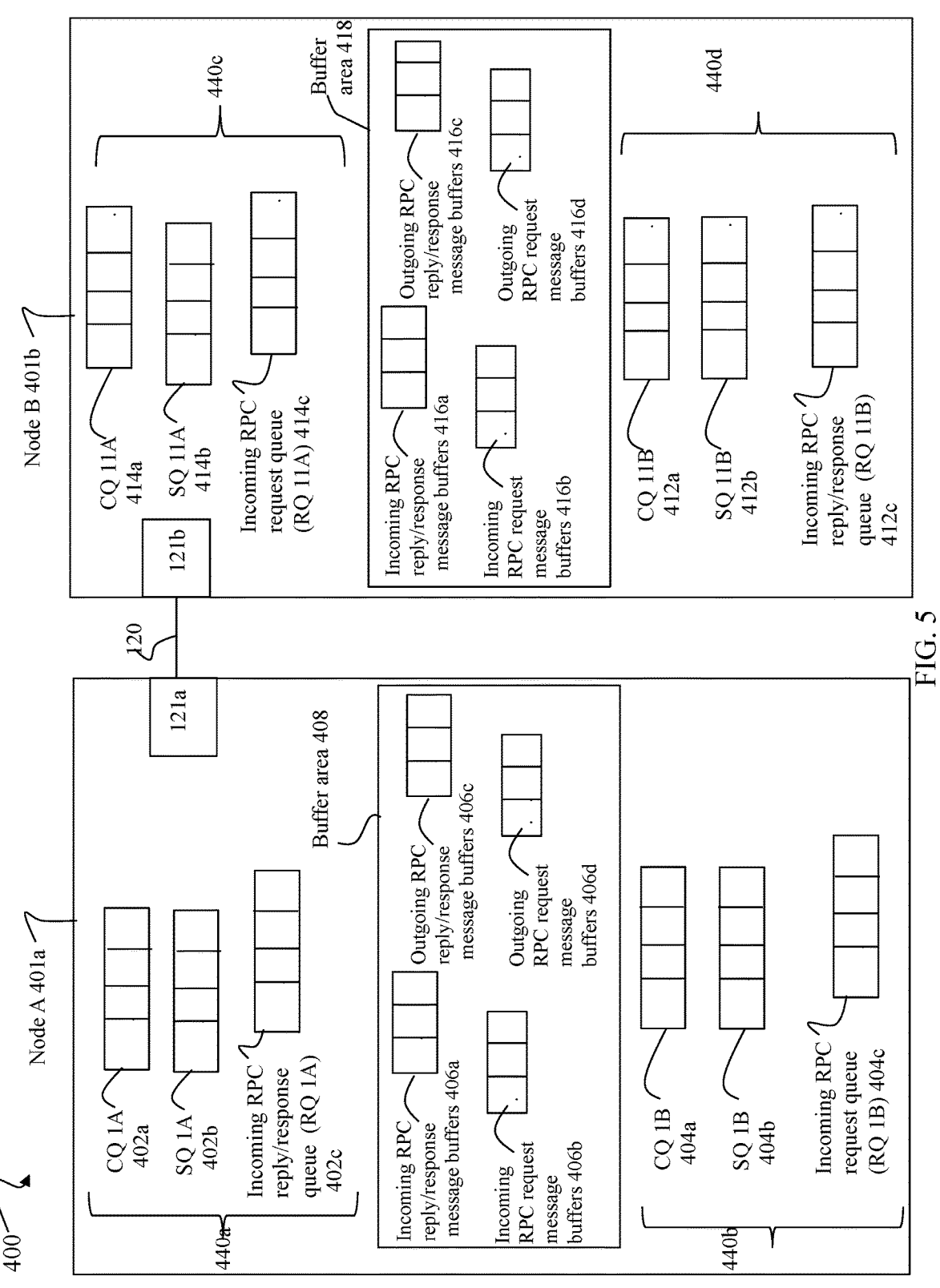

Referring to FIG. 5, shown is an example 400 of a simplified view or representation of the queues and buffers of FIG. 4 for a single client service in at least one embodiment in accordance with the techniques of the present disclosure.

Node A 401a can include the queues sets 440a and 440b; and node B 401b can include the queue sets 440c and 440d. The queue set 440a of node A can include the queues 402a-c analogous to the queues 302a-c of 302 of FIG. 4 used when node A is an initiator for sending outgoing RPC requests to node B and receiving incoming RPC replies or responses from node B. The queue set 440b of node A can include the queues 404a-c analogous to the queues 322a-c of 322 of FIG. 4 used when node A is a target that receiving incoming RPC requests from node B and sending outgoing RPC replies or responses from node B.

Node A 401a can include a buffer area 408 including buffers storing content of messages sent by node A to node B, and messages received at node A from node B. The buffer area 408 can include incoming RPC reply/response message buffers 406a, incoming RPC request message buffers 406b, outgoing RPC reply/response buffers 406c, and outgoing RPC request message buffers 406d. Consistent with other discussion herein such as in connection with FIG. 4, the buffers 406a and 406d can be used when node A 401a serves as an initiator of an RPC request such as a MAP RPC request, and the buffers 406b and 406c can be used when node A 401a serves a target of an RPC request such as a MAP RPC request.

The queue set 440c of node B 401b can include the queues 414a-c analogous to the queues 312a-c of 312 of FIG. 4 used when node B is a target that receives incoming RPC requests from node A and sends outgoing RPC replies or responses to node A. The queue set 440d of node B can include the queues 412a-c analogous to the queues 332a-c of 332 of FIG. 4 used when node B is an initiator that sends outgoing RPC requests to node A and receives incoming RPC replies or responses from node A.

Node B 401b can include a buffer area 418 including buffers storing content of messages sent by node B to node A, and messages received at node B from node A. The buffer area 418 can include incoming RPC reply/response message buffers 416a, incoming RPC request message buffers 416b, outgoing RPC reply/response buffers 416c, and outgoing RPC request message buffers 416d. Consistent with other discussion herein such as in connection with FIG. 4, the buffers 416a and 416d can be used when node B serves as an initiator of an RPC request such as a MAP RPC request, and the buffers 416b and 416c can be used when node B serves a target of an RPC request such as a MAP RPC request.

As noted above, the elements 440a-d can represent a collective set of queues for a single service in at least one embodiment in accordance with the techniques of the present disclosure. In at least one embodiment, there can be multiple services where each such service can have a set of queues as generally represented in FIG. 5. In at least one embodiment, each such multiple service can be assigned a polling priority that is one of a critical polling priority or a non-critical polling priority in accordance with the priority of the associated service and its messages. In at least one embodiment, at least one service can send critical messages, such as MAP RPC messages of a latency sensitive I/O workflow of the data path, assigned a critical polling priority; and at least one service can send non-critical messages such as those associated with non-latency sensitive or less latency sensitive non-critical workflows such as background (BG) workflows.

Figure 6:
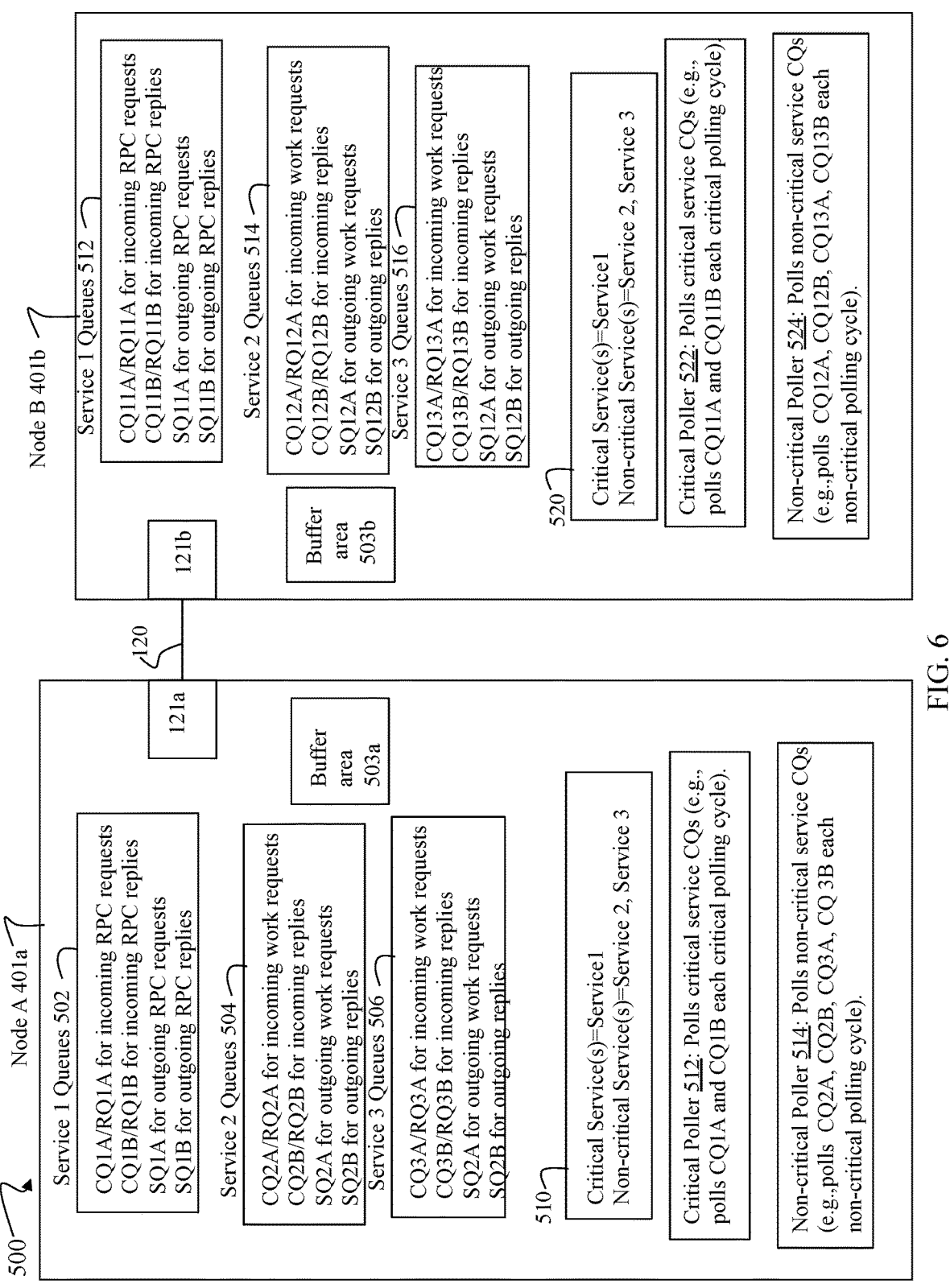

With reference to FIG. 6, shown is an example 500 illustrating sets of queues of multiple services, assigned polling priorities, and two pollers or polling threads that can be used in at least one embodiment in accordance with the techniques of the present disclosure.

The example 500 illustrates an embodiment including 3 client services for simplicity of illustration. However, more generally the techniques of the present disclosure can be used in connection with any suitable number of services. For example, in at least one embodiment, there can be 30 client services in total with 1 critical priority client service and 29 non-critical or normal priority client services, where the 1 critical priority client service is assigned a critical polling priority and the remaining 29 non-critical client services are each assigned a non-critical polling priority.

In the example 500, each of the 3 client services includes associated queues on both node A 401a and node B 401b. Service 1 has associated queue sets 502 of node A and 512 of node B. Service 2 has associated queue sets 504 of node A and 514 of node B. Service 3 has associated queue sets

506 of node A and 516 of node B. Each of the queue sets 502, 504, 506, 512, 514 and 516 includes 6 queues: a CQ and associated RQ for incoming RPC requests or messages; a CQ and associated RQ for incoming RPC replies or messages; an SQ for outgoing RPC requests or messages; and an SQ for outgoing RPC replies or messages.

In the example 500, node A 401a includes: queue set 502 denoting the service 1 queues on node A for client service 1; queue set 504 denoting the service 2 queues on node A for client service 2; and queue set 506 denoting the service 3 queues on node A for client service 3. Node A 401a also include buffer area 503a denoting at least a portion of node A's memory used for buffers of incoming messages received by node A. Node B 401b also include buffer area 503b denoting at least a portion of node B's memory used for buffers of incoming messages received by node B.

In the example 500, node B 401b includes: queue set 512 denoting the service 1 queues on node A for client service 1; queue set 514 denoting the service 2 queues on node A for client service 2; and queue set 516 denoting the service 3 queues on node A for client service 3.

Node A 401a can also include information 510 regarding the particular polling priority assigned to each of the 3 services based, at least in part, on the relative importance or criticality of the messages sent and/or received by each service relative to the other services. In this example 500 as illustrated in 510, service 1 can be classified as a critical service and assigned a corresponding critical polling priority; the remaining services, service 2 and 3, can be classified as non-critical services and each assigned a corresponding non-critical polling priority.

The node A 401a can include critical poller or polling thread 512 and non-critical poller or polling thread 514. The critical polling thread 512 can poll critical service CQs each critical polling cycle, where such critical CQs collectively are included in one or more services assigned a critical polling priority as a result of being classified as a critical service. In at least one embodiment, the CQs of critical services can be collectively included in a single list, or other suitable structure, forming a critical CQ list. Critical polling can be performed by the critical poller 512 at a critical polling frequency when a critical polling cycle is performed. In at least one embodiment at each occurrence of a critical polling cycle, the critical poller 512 can traverse each CQ of the critical CQ list for receipt of any incoming message associated with a CQE of one of the critical CQs on the critical CQ list. To further illustrate, assume assigned polling priorities as denoted by element 510 such that only service 1 is assigned a critical polling priority, and that services 2 and 3 are each assigned a non-critical polling priority. In this example on node A, the critical CQ list of node A includes CQ1A and CQ1B of service 1 queue set 502. Each critical polling cycle on node A can include critical poller 512 checking CQ1A and CQ1B for newly received incoming messages. In particular, CQ1A and CQ1B can be traversed each critical polling cycle for any associated incoming messages, such as RPC requests or replies received by node A. In at least one embodiment where each CQ is implemented as an array, linked list or other suitable structure of CQEs, CQEs of each CQ of the critical CQ list can be traversed to determine whether the CQE is associated with a new incoming message received at node A that needs processing. Responsive to a CQE of a CQ of the critical CQ list being associated with a new incoming message not yet processed, the critical poller 512 can be signaled or notified of the CQE. The critical poller 512 can then further provide the CQE, or a WQE of an RQ associated with the CQE, to another application or service thread of the particular client service that owns or includes the CQE. For example, the critical poller 512 can be notified, during a critical polling cycle, that CQ1A of service 1 includes a CQE associated with an incoming RPC request or message that needs processing. In response, the critical poller 512 can forward the CQE, or WQE of RQ1A associated with the incoming RPC request or message, to another thread of service 1 for handling or servicing.

The non-critical polling thread 514 of node A can poll non-critical service CQs each non-critical polling cycle, where such non-critical CQs collectively are included in one or more services assigned a non-critical polling priority as a result of being classified as a non-critical service. In at least one embodiment, the CQs of non-critical services can be collectively included in a single list, or other suitable structure, forming a non-critical CQ list. Non-critical polling can be performed by the non-critical poller 514 at a non-critical polling frequency when a non-critical polling cycle is performed. In at least one embodiment at each occurrence of a non-critical polling cycle, the non-critical poller 514 can traverse each CQ of the non-critical CQ list for receipt of any incoming message associated with a CQE of one of the non-critical CQs on the non-critical CQ list. To further illustrate, assume assigned polling priorities as denoted by element 510 such that only service 1 is assigned a critical polling priority, and that services 2 and 3 are each assigned a non-critical polling priority. In this example on node A, the non-critical CQ list of node A includes CQ2A and CQ2B of service 2 queue set 504, and includes CQ3A and CQ2B of service 3 queue set 506. Each non-critical polling cycle on node A can include the non-critical poller 514 checking CQ2A, CQ2B, CQ3A and CQ3B for newly received incoming messages. In particular, CQ2A, CQ2B, CQ3A and CQ3B can be traversed each critical polling cycle for any associated incoming messages, such as RPC requests or replies received by node A. In at least one embodiment where each CQ is implemented as an array, linked list or other suitable structure of CQEs, CQEs of each CQ of the non-critical CQ list can be traversed to determine whether the CQE is associated with a new incoming message received at node A that needs processing. Responsive to a CQE of a CQ of the non-critical CQ list being associated with a new incoming message not yet processed, the non-critical poller 514 can be signaled or notified of the CQE. The non-critical poller 514 can then further provide the CQE, or a WQE of an RQ associated with the CQE, to another application or service thread of the particular client service that owns or includes the CQE. For example, the non-critical poller 514 can be notified, during a non-critical polling cycle, that CQ2A of service 2 includes a CQE associated with an incoming message that needs processing. In response, the non-critical poller 514 can forward the CQE, or WQE of RQ2A associated with the incoming message, to another thread of service 2 for handling or servicing.

In at least one embodiment, the critical CQ list of critical CQs on node A can be polled more frequently than the non-critical CQ list of non-critical CQs. Thus, the critical polling frequency can be greater than the non-critical polling frequency such that the critical polling cycle frequency is greater than the non-critical polling cycle frequency.

Node B 401b can include information 520 similar to the information 510 of node A regarding the particular polling priority assigned to each of the 3 services based, at least in part, on the relative importance or criticality of the messages sent and/or received by each service relative to the other services. In this example 500 as illustrated in 520, service 1 can be classified as a critical service and assigned a corresponding critical polling priority; the remaining services, service 2 and 3, can be classified as non-critical services and each assigned a corresponding non-critical polling priority.

The node B 401b can include critical poller or polling thread 522 and non-critical poller or polling thread 524. The critical polling thread 522 can poll critical service CQs each critical polling cycle, where such critical CQs collectively are included in one or more services assigned a critical polling priority as a result of being classified as a critical service. In at least one embodiment, the CQs of critical services can be collectively included in a single list, or other suitable structure, forming a critical CQ list. Critical polling can be performed by the critical poller 522 at a critical polling frequency when a critical polling cycle is performed. In at least one embodiment at each occurrence of a critical polling cycle, the critical poller 522 can traverse each CQ of the critical CQ list for receipt of any incoming message associated with a CQE of one of the critical CQs on the critical CQ list. To further illustrate, assume assigned polling priorities as denoted by element 520 such that only service 1 is assigned a critical polling priority, and that services 2 and 3 are each assigned a non-critical polling priority. In this example on node B, the critical CQ list of node B includes CQ11A and CQ11B of service 1 queue set 512. Each critical polling cycle on node B can include critical poller 522 checking CQ11A and CQ11B for newly received incoming messages at node B. In particular, CQ11A and CQ11B can be traversed each critical polling cycle for any associated incoming messages, such as RPC requests or replies received by node B. In at least one embodiment where each CQ is implemented as an array, linked list or other suitable structure of CQEs, CQEs of each CQ of the critical CQ list can be traversed to determine whether the CQE is associated with a new incoming message received at node B that needs processing. Responsive to a CQE of a CQ of the critical CQ list of node B being associated with a new incoming message not yet processed, the critical poller 522 can be signaled or notified of the CQE. The critical poller 522 can then further provide the CQE, or a WQE of an RQ associated with the CQE, to another application or service thread of the particular client service that owns or includes the CQE. For example, the critical poller 522 can be notified, during a critical polling cycle, that CQ11A of service 1 includes a CQE associated with an incoming RPC request or message that needs processing. In response, the critical poller 522 can forward the CQE, or WQE of RQ11A associated with the incoming RPC request or message, to another thread of service 1 on node B for handling or servicing.

The non-critical polling thread 524 of node B can poll non-critical service CQs each non-critical polling cycle, where such non-critical CQs collectively are included in one or more services assigned a non-critical polling priority as a result of being classified as a non-critical service. In at least one embodiment, the CQs of non-critical services can be collectively included in a single list, or other suitable structure, forming a non-critical CQ list. Non-critical polling can be performed by the non-critical poller 524 at a non-critical polling frequency when a non-critical polling cycle is performed. In at least one embodiment at each occurrence of a non-critical polling cycle, the non-critical poller 524 can traverse each CQ of the non-critical CQ list of node B for receipt of any incoming message associated with a CQE of one of the non-critical CQs on the non-critical CQ list. To further illustrate, assume assigned polling priorities as denoted by element 520 such that only service 1 is assigned a critical polling priority, and that services 2 and 3 are each assigned a non-critical polling priority. In this example on node B, the non-critical CQ list of node B includes CQ12A and CQ12B of service 2 queue set 514, and includes CQ13A and CQ13B of service 3 queue set 516. Each non-critical polling cycle on node B can include the non-critical poller 524 checking CQ12A, CQ12B, CQ13A and CQ13B for newly received incoming messages. In particular, CQ12A, CQ12B, CQ13A and CQ13B can be traversed each critical polling cycle for any associated incoming messages, such as RPC requests or replies received by node B. In at least one embodiment where each CQ is implemented as an array, linked list or other suitable structure of CQEs, CQEs of each CQ of the non-critical CQ list can be traversed to determine whether the CQE is associated with a new incoming message received at node B that needs processing. Responsive to a CQE of a CQ of the non-critical CQ list being associated with a new incoming message not yet processed, the non-critical poller 524 can be signaled or notified of the CQE. The non-critical poller 524 can then further provide the CQE, or a WQE of an RQ associated with the CQE, to another application or service thread of the particular client service that owns or includes the CQE. For example, the non-critical poller 524 can be notified, during a non-critical polling cycle, that CQ12A of service 2 includes a CQE associated with an incoming message that needs processing. In response, the non-critical poller 524 can forward the CQE, or WQE of RQ12A associated with the incoming message, to another thread of service 2 on node B for handling or servicing.

In at least one embodiment, the critical CQ list of critical CQs on node B can be polled more frequently than the non-critical CQ list of non-critical CQs. Thus, the critical polling frequency can be greater than the non-critical polling frequency such that the critical polling cycle frequency is greater than the non-critical polling cycle frequency.

It should be noted that although the above FIG. 6 references RPC requests and replies in connection with the various queues, more generally, the various queues can be used in connection with any incoming and outgoing messages. For example, an initiator can generally issue a request to a target to perform work or processing, and the target can return a respective reply based at least in part on the request processing performed. Thus as an initiator, a node can include an SQ for outgoing requests, an RQ for corresponding replies, and a CQ associated with the RQ to signal or indicate when incoming replies associated with the RQ are received by the initiator from a remote target node. As a target, a node can include an RQ for receiving incoming requests from an initiator, a CQ associated with the RQ to signal when incoming requests associated with the RQ are received from an initiator, and an SQ for sending outgoing replies in response to received requests from a remote initiator.

In at least one embodiment, the service queues, associated buffers/buffer areas, assigned per service polling priorities, critical polling frequency, non-critical polling frequency, critical poller and non-critical poller as described in connection with M=3 services a node of FIG. 6 can be on a dedicated per core basis or each single core of the node used in connection with the techniques of the present disclosure. Put another way, the arrangement of FIG. 6 can illustrate various components for multiple services, M services, associated with a single core of node A and a single core of node B. In some embodiments as further illustrated in FIG. 7 below, each node can include multiple cores used in connection with the techniques of the present disclosure such that each core of each node A includes a core-specific instance of the components as illustrated on node A 401*a* in FIG. 6, and such that each core of node B includes a core-specific instance of the components as illustrated on node B 401*b* in FIG. 6.

Figure 7:
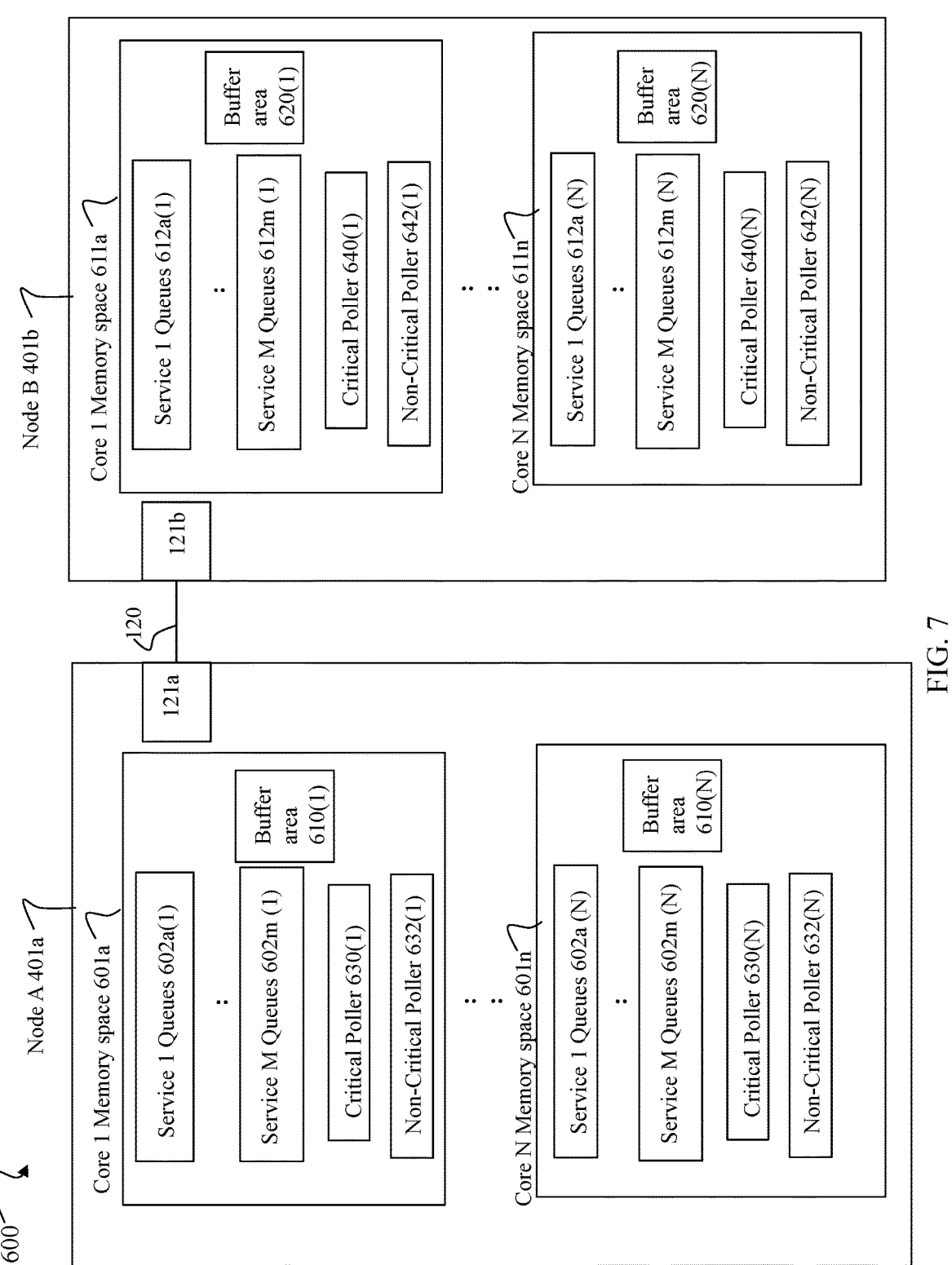

Referring to FIG. 7, shown is an example 600 illustrating components that can be used in an embodiment in accordance with the techniques herein for multiple services with multiple cores on nodes A and B.

In the example 600, assume that generally there a M services and N cores on each of the nodes A and B used in connection with the techniques of the present disclosure.

In the example 600, node A 401*a* can include core memory spaces 601*a*-*n* respectively associated with cores 1-N on node A. Each single one of the N cores can have its own dedicated core-specific memory space on node A 401*a*. The N core memory spaces 601*a*-*n* can include M service queue sets 602, buffer areas 610, critical pollers 630 and non-critical pollers 632. For example, core 1 of node A 401*a* can have its own core 1 memory space 601*a* of core-specific instance of components including: M sets of service queues 602*a*(1)-602*m*(1), critical poller 630(1), non-critical poller 632(1), and buffer area 610(1).

In the example 600, node B 401*b* can include core memory spaces 611*a*-*n* respectively associated with cores 1-N on node B. Each single one of the N cores of node B can have its own dedicated core-specific memory space on node B 401*b*. The N core memory spaces 611*a*-*n* can include M service queue sets 612, buffer areas 620, critical pollers 640 and non-critical pollers 642. For example, core 1 of node B 401*b* can have its own core 1 memory space 611*a* of core-specific instance of components including: M sets of service queues 612*a*(1)-612*m*(1), critical poller 640(1), non-critical poller 642(1), and buffer area 620(1).

Described above are techniques that can be used in at least one embodiment for reducing latency introduced by MAP RPC requests and thus for improving end-to-end I/O latency in an active-active data storage system. In at least one embodiment, the reduction in I/O latency can be achieved while incurring a minimal or negligible increase in CPU cost relative to at least one arrangement not using the techniques of the present disclosure. As discussed herein, a separate critical poller can be used in connection with polling CQs associated with critical messages such as MAP RPC requests. In at least one embodiment, this separate critical poller can be called more frequently than a non-critical poller. In at least one embodiment, it can be expected that each critical polling cycle performs less work or processing than each non-critical polling cycle due to the expected number of critical and non-critical CQs as well as the maximum concurrent number of received messages and CQEs associated with each such CQ. In at least one embodiment, the maximum concurrent number of critical messages and associated CQEs of a single critical CQ can be less than the maximum concurrent number of non-critical messages and associated CQEs of a single non-critical CQ. Thus although the critical poller can perform a critical polling cycle more frequently than a non-critical poller performs a non-critical polling cycle, in at least one embodiment the expected critical polling cycle time can be expected to be much less than the expected non-critical polling cycle time.

Illustrative embodiments of the techniques of the present disclosure as described herein include a separate critical poller for critical (i.e., latency-sensitive) messages, such as MAP RPC messages, and separate non-critical poller for non-critical messages (i.e., internode communications of other work flows such as background workflows, that are less latency sensitive). The critical and non-critical pollers can be separate independent pollers such as two separate different polling threads. In at least one embodiment, the critical poller for critical services and messages can be called more frequently than the non-critical poller for non-critical services and messages. Since in at least one embodiment the number of critical messages are typically only a small fraction of the number of non-critical messages, each critical polling cycle can shorter in time duration than each non-critical polling cycle. In at least one embodiment, polling cycle calling frequencies of the above critical and non-critical pollers can be adjusted so that the respective poller run time is negligible relative to the corresponding polling cycle runtime. As a result in at least one embodiment, critical message polling latency can be very small, while overall CPU usage remains virtually unaffected.

In at least one embodiment as discussed herein, given a set of services or client services, each client service is assigned either normal non-critical polling priority or critical polling priority. In at least one embodiment, critical polling priority can be reserved for one or more client services of the set whose messages can be characterized as critical or higher priority relative to other messages and services. In at least one embodiment, the critical messages can be sent and received during critical path I/O request processing. In at least one embodiment, each service can include its own dedicated one or more CQs. On service creation or registration, each service's one or more CQs can be placed into a collective per priority list of RDMA CQs. For example, there can be a list of critical CQs of services assigned a critical polling priority, and there can be a second separate list of non-critical CQs of services assigned a non-critical polling priority. Each non-critical polling cycle can include the non-critical poller looping or traversing over the non-critical RDMA CQ list and processes each CQ in the list as follows. In at least one embodiment, non-critical polling processing can check if any non-critical messages have been received and if so, further send the received message to a corresponding client service for handling. Similarly, the critical poller cycle loops or traverses over the critical RDMA CQ list for any critical messages received.

In at least one embodiment, the critical polling cycle can be performed at a higher frequency than the non-critical polling cycle. In at least one embodiment, CPU usage and latency are affected by parameters such as polling cycle calling frequency and time being spent in each such polling cycle. Clearly, there is a tradeoff between CPU usage and latency. As polling cycle frequency increases, given that time spent in each polling cycle can be substantial, latency decreases but CPU usage increases. The inventors experimented using the techniques of the present disclosure in a system under test that included 30 client services where no I/O request traffic was running. In one arrangement or first configuration not using the techniques of the present disclosure in which only a single poller was used to poll all CQs of all 30 services in a node, each polling cycle was observed to be about or approximately 4 microseconds. In contrast, the system under test was then configured with an arrangement in accordance with the techniques of the present disclosure with a separate critical poller and a separate non-critical poller with non-critical poller servicing 29 of the 30 client services and critical poller servicing 1 of the 30 client services. In the arrangement in accordance with the techniques of the present disclosure, the non-critical polling cycle duration or run time was still observed to approximate (e.g., within specified tolerances or limits) 4 microsecond while the critical polling cycle duration or run time was observed to approximate 0.1 microseconds. Because of the negligible critical polling cycle time of about 0.1 microseconds, the critical polling cycle frequency or rate can be increased such as for MAP RPC critical messages to reduce I/O read latency without visibly impacting CPU utilization and I/O bandwidth (e.g., I/Os processed per second or IOPS). For example, without using the techniques of the present disclosure using the first above-noted configuration of the system under test, the overall polling cycle time was approximately 4 microseconds. Because of the negligible critical polling cycle time of about 0.1 microseconds, the critical polling cycle frequency can be increased and greater than the non-critical polling cycle frequency with minor or negligible impact on CPU utilization and IOPS. Based on the above in the system under test, the first configuration not using the techniques of the present disclosure has approximately a 4 microsecond polling cycle time, and the latter configuration using the techniques of the present disclosure also results in approximately a collective amount of runtime of 4 microseconds when the considering the combined runtime of both a single critical polling cycle and a single non-critical polling cycle. Note that polling cycle runtime can be directly or linearly translated into an amount of CPU resources consumed. Thus in at least one embodiment such as illustrated by the system under test, the very small critical polling cycle time of about 0.1 microseconds allows for increasing the critical polling rate for critical messages (such as Map RPC messages), and therefore to dramatically reduce I/O read latency, without visible adverse impact on CPU utilization and IOPS. It should be noted that the optimal rate or frequency for the critical polling cycle and thus calling the critical poller can vary per system and can be determined based on performance tuning by executing performance test runs for different I/O patterns.

It should be noted that although the foregoing discussion presents embodiments in which both requests and replies, such as respectively MAP RPC requests and MAP RPC responses, can be categorized as critical messages, an embodiment can also characterize requests as critical messages and associated replies as non-critical messages; or characterize requests as non-critical messages and associated replies as critical messages, as may vary with embodiment.

Referring to FIGS. 8A and 8B, shown is a flowchart 700, 701 summarizing processing described above that can be performed in at least one embodiment in accordance with the techniques of the present disclosure. The FIGS. 8A and 8B describe processing with respect to a queues for services including an RQ and associated CQ of a local node, where the RQ is configured in an RDMA pairing relationship with an SQ of a remote node such that the SQ is configured to synchronize via RDMA with the RQ of the local node. Thus FIGS. 8A and 8B generally relate to sending a message (that is stored in a remote node's memory and that is associated with a WQE of the SQ of the remote node) via RDMA to a local node, where the received message is stored in a buffer of the local node's memory, where the buffer is associated with a WQE of the RQ of the local node, and where a CQE of the CQ associated with the RQ is used to signal completed receipt of the message by the local node. Generally, the foregoing can relate to the local node receiving a message that is content of a request for work to be completed by the local node, such as a MAP RPC request sent from the remote node as the initiator of the MAP RPC request. Also, the foregoing can generally relate to the local node receiving a message that is a reply, such as a MAP RPC reply sent from the remote node as the target of a MAP RPC request previously sent from the local node to the remote node.

More generally, each queue set for a service described in connection with FIGS. 8A and 8B can include one or more additional RQs, SQs, and CQs as described herein as well as possibly other queues.

At the step 702, for a set S1 of services, assign each service of the set S1 a polling priority of either a normal non-critical polling priority or a critical polling priority. Each service of S1 is associated with a corresponding service queue set on a local node. Each service queue set of the local node associated with a corresponding one of the services of S1 includes: an RQ of WQEs associated with received messages sent by a remote node via RDMA to the local node; and a CQ of CQEs where the CQ is associated with the RQ. Additionally, each RQ of the service queue set of the local node can be configured to synchronize via RDMA with an SQ of the remote node such that when a first WQE1 (that is associated with an outgoing message stored in the remote node's memory) is enqueued in the remote node's SQ, the outgoing message of the remote node is sent via RDMA to the local node, where the outgoing message is received by the local node, and stored in an incoming message buffer of the local node's memory. The incoming buffer message buffer of the local node can be associated with a second WQE2 of the synchronized RQ of the local node.

Additionally, in response to storing the message in the incoming message buffer of the WQE2 of the RQ having an associated CQ, a completion signal or indicator is generated to indicate that the WQE2 of the RQ is associated with a received incoming message that needs servicing or handling by the service associated with the RQ. In at least one embodiment, the CQ can include a CQE associated with WQE2 and the received message of the local node, where the CQE serves as an indicator or signal that the received message associated with WQE2, and thus the CQE, needs servicing or handling by the local node. From the step 702, processing proceeds to the step 704.

At the step 704, partition the CQs of the service queue sets associated with the services of the set S1 in accordance with assigned polling priorities to generate a non-critical CQ list of the local node and a critical CQ list of the local node. The non-critical CQ list includes CQs associated with each service of the set S1 assigned the normal non-critical polling priority; and the critical CQ list includes CQs associated with each service of the set S1 assigned the critical polling priority. From the step 704, processing proceeds to the step 706.

At the step 706, poll each CQ of the non-critical CQ list on the local node by a non-critical poller at a first non-critical polling frequency. Polling each CQ of the non-critical CQ list includes polling each such CQ for completion signals or indicators associated with corresponding received non-critical messages of the local node to be serviced. Polling the non-critical CQ list includes the non-critical poller of the local node traversing all CQs of the non-critical CQ list to determine CQEs of corresponding incoming work requests or messages that have been received at the local node and need servicing. For each CQE that indicates a corresponding work request or message has been received and needs servicing, perform processing to service the work request or message. In at least one embodiment, the non-critical poller can remove a CQE from a non-critical CQ, and then forward the CQE or its corresponding work request or message to a worker thread of a corresponding service to service or handle the work request or message.

For each RQ of a queue set of the local node associated with a corresponding non-critical CQ, each CQE of the non-critical CQ can be associated with a WQE of the RQ, where the WQE of the RQ references or points to a buffer in the local node's memory, and where the buffer stores an incoming non-critical message transmitted via RDMA to the local node from the remote node. From the step 706, processing proceeds to the step 708.

At the step 708, poll each CQ of the critical CQ list on the local node by a critical poller at a first non-critical polling frequency. Polling each CQ of the critical CQ list includes polling each such CQ for completion signals or indicators associated with corresponding received critical messages of the local node to be serviced. Polling the critical CQ list includes the critical poller of the local node traversing all CQs of the critical CQ list to determine CQEs of corresponding incoming work requests or messages that have been received at the local node and need servicing. For each CQE that indicates a corresponding work request or message has been received and needs servicing, perform processing to service the work request or message. In at least one embodiment, the critical poller can remove a CQE from a critical CQ, and then forward the CQE or its corresponding work request or message to a worker thread of a corresponding service to service or handle the work request or message.

For each RQ of a queue set of the local node associated with a corresponding critical CQ, each CQE of the critical CQ can be associated with a WQE of the RQ, where the WQE of the RQ references or points to a buffer in the local node's memory, and where the buffer stores an incoming critical message transmitted via RDMA to the local node from the remote node.

It should be noted that the steps 706 and 708 can be performed in parallel or more generally independently of one another such that the critical polling performed by the critical poller and the non-critical polling performed by the non-critical poller are independent of one another and in accordance with their respective polling critical polling frequency and non-critical polling frequency.

In at least one embodiment, the one or more critical services and one or more associated critical CQs can include MAP RPC messages (e.g., MAP RPC requests and/or replies) or other suitable critical priority messages that are included in I/O latency sensitive workflows. In at least one embodiment, the one or more non-critical services and one or more associated non-critical CQs can include lower priority non-critical messages or other suitable critical priority messages that are included in lower priority workflows such as a background workflow that is less latency sensitive than an I/O latency sensitive workflow. Put another way, in at least one embodiment, the non-critical CQs, non-critical messages and non-critical services can be included in workflows that may not be expected to have a direct significant impact on I/O latency relative to critical CQs, critical messages and critical services.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:

for a first plurality of services, assigning each service of the first plurality a polling priority of a non-critical polling priority or a critical polling priority, wherein each service of the first plurality is associated with a corresponding service queue set of a second plurality of service queue sets of a local node, wherein each service queue set of the second plurality of service queue sets associated with a corresponding service of the first plurality includes a completion queue (CQ) and an associated receiving queue (RQ) of work queue entries (WQEs) associated with received messages that are stored in a first memory of the local node and sent by a remote node via remote direct memory access (RDMA);

partitioning CQs of the second plurality of service queue sets associated with the first plurality of services in accordance with assigned polling priorities to generate a non-critical CQ list of the local node and a critical CQ list of the local node, wherein the non-critical CQ list includes CQs associated with services of the first plurality assigned the non-critical polling priority, and wherein the critical CQ list includes CQs associated with services of the first plurality assigned the critical polling priority;

polling each CQ of the non-critical CQ list on the local node by a non-critical poller at a non-critical polling frequency, wherein said polling said each CQ of the non-critical CQ list includes polling said each CQ of the non-critical CQ list for completion signals or indicators associated with corresponding received non-critical messages of the local node to be serviced; and polling each CQ of the critical CQ list on the local node by a critical poller at a critical polling frequency, wherein said polling said each CQ of the critical CQ list includes polling said each CQ of the critical CQ list for completion signals or indicators associated with corresponding received critical messages of the local node to be serviced.

2. The computer-implemented method of claim 1, wherein each RQ of the second plurality of service queue sets is configured to synchronize via RDMA with an Send Queue (SQ) of the remote node such that when a first WQE (work queue element or entry), that is associated with an outgoing message stored in a second memory of the remote node, is enqueued in the SQ of the remote node, the outgoing message is sent via RDMA from the remote node to the local node, where the outgoing message is received by the local node and stored in an incoming message buffer of the first memory of the local node, wherein the incoming message buffer of the local node is associated with a second WQE of the RQ that synchronizes via RDMA with the SQ.

3. The computer-implemented method of claim 2, further comprising:

in response to storing, via RDMA, the outgoing message of the remote node in the incoming message buffer of the second WQE of the RQ having an associated CQ on the local node, generating a completion signal or indicator to indicate that the second WQE of the RQ associated with the incoming message buffer needs servicing or handling by a service of the first plurality associated with the RQ.

4. The computer-implemented method of claim 3, wherein the CQ associated with the RQ includes a CQ Entry (CQE) associated with the second WQE and the incoming message buffer whereby the CQE serves as a signal or indicator that a received message of the local node stored in the incoming message buffer needs servicing or handling by the local node.

5. The computer-implemented method of claim 1, further comprising:

for each completion signal or indicator of a CQ of the non-critical list associated with a corresponding received non-critical message of the local node, servicing said received non-critical message by the local node.

6. The computer-implemented method of claim 5, wherein said servicing said received non-critical message of the local node includes forwarding any of: a CQE of the CQ where the CQE is associated with said received non-critical message, or a WQE of an RQ associated with the CQ where the WQE is associated with said received non-critical message, to a worker thread of one service of the first plurality executing on the local node, wherein said one service is assigned the non-critical polling frequency and said one service is associated with the RQ and the CQ on the local node.

7. The computer-implemented method of claim 6, wherein for each RQ of a queue set of the second plurality that is associated with a corresponding CQ of the queue set of a service assigned the non-critical polling priority, each CQE of the corresponding CQ is associated with a WQE of said each RQ wherein the WQE references a buffer in the first memory of the local node, and wherein the buffer stores an incoming non-critical message transmitted via RDMA from the local node to the remote node.

8. The computer-implemented method of claim 1, further comprising:

for each completion signal or indicator of a CQ of the critical list associated with a corresponding received critical message of the local node, servicing said received critical message by the local node.

9. The computer-implemented method of claim 8, wherein said servicing said received critical message of the local node includes forwarding any of: a CQE of the CQ where the CQE is associated with said received critical message, or a WQE of an RQ associated with the CQ where the WQE is associated with said received critical message, to a worker thread of one service of the first plurality executing on the local node, wherein said one service is assigned the critical polling frequency and said one service is associated with the RQ and the CQ on the local node.

10. The computer-implemented method of claim 9, wherein for each RQ of a queue set of the second plurality that is associated with a corresponding CQ of the queue set of a service assigned the critical polling priority, each CQE of the corresponding CQ is associated with a WQE of said each RQ wherein the WQE references a buffer in the first memory of the local node, wherein the buffer stores an incoming critical message transmitted via RDMA from the local node to the remote node.

11. The computer-implemented method of claim 1, wherein the critical poller and the non-critical poller are separate independent pollers.

12. The computer-implemented method of claim 1, wherein the critical poller is a first dedicated critical polling thread that only performs critical polling of CQs associated with services of the first plurality assigned the critical polling priority, and wherein the non-critical poller is a second dedicated non-critical polling thread that only performs non-critical polling of CQs associated with services of the first plurality assigned the non-critical polling priority.

13. The computer-implemented method of claim 1, wherein the critical polling frequency indicates a greater polling frequency than the non-critical polling frequency such that critical polling, as performed by the critical poller, is performed at a greater frequency that non-critical polling, as performed by the non-critical poller.

14. The computer-implemented method of claim 1, wherein a first service of the first plurality is assigned the critical polling frequency, a first queue set of the second plurality is associated with the first service, the first queue set including a first RQ, and a first CQ that is associated with the first RQ and that signals completed receipt of critical messages by the local node.

15. The computer-implemented method of claim 1, wherein the first RQ includes WQEs associated with received map RPC (remote procedure call) requests each requesting that the local node performing address resolution mapping for an associated user data logical address owned by the local node but not the remote node, wherein each of the map RPC requests is sent via RDMA from the remote node to the local node, and wherein the remote node is an initiator of the map RPC requests issued to the remote node as a target of the map RPC requests.

16. The computer-implemented method of claim 15, wherein each of the map RPC requests is sent from the remote node to the local node via RDMA in response to the remote node receiving a read I/O directed to a target logical address that is owned by the local node but not the remote node.

17. The computer-implemented method of claim 1, wherein the first RQ includes WQEs associated with received map RPC (remote procedure call) replies received by the local node from the remote node in response to prior corresponding RPC requests sent from the local node to the remote node, where each of the RPC requests sent from the local node to the target node is a request that the target node performing address resolution mapping for an associated user data logical address owned by the remote node but not the local node, wherein each of the map RPC requests is sent via RDMA from the local node to the local node, wherein each of the map RPC replies is sent via RDMA from the remote node to the local node, wherein the local node is an initiator of the map RPC requests issued to the remote node as a target of the map RPC requests.

18. The computer-implemented method of claim 17, wherein each of the map RPC requests is sent from the local node to the remote node via RDMA in response to the local node receiving a read I/O directed to a target logical address that is owned by the remote node but not the local node.

19. A non-transitory computer readable medium comprising code stored thereon that, when executed, performs a method comprising:

for a first plurality of services, assigning each service of the first plurality a polling priority of a non-critical polling priority or a critical polling priority, wherein each service of the first plurality is associated with a corresponding service queue set of a second plurality of service queue sets of a local node, wherein each service queue set of the second plurality of service queue sets associated with a corresponding service of the first plurality includes a completion queue (CQ) and an associated receiving queue (RQ) of work queue entries (WQEs) associated with received messages that are stored in a first memory of the local node and sent by a remote node via remote direct memory access (RDMA);

partitioning CQs of the second plurality of service queue sets associated with the first plurality of services in accordance with assigned polling priorities to generate a non-critical CQ list of the local node and a critical CQ list of the local node, wherein the non-critical CQ list includes CQs associated with services of the first plurality assigned the non-critical polling priority, and wherein the critical CQ list includes CQs associated with services of the first plurality assigned the critical polling priority;

polling each CQ of the non-critical CQ list on the local node by a non-critical poller at a non-critical polling frequency, wherein said polling said each CQ of the non-critical CQ list includes polling said each CQ of the non-critical CQ list for completion signals or indicators associated with corresponding received non-critical messages of the local node to be serviced; and polling each CQ of the critical CQ list on the local node by a critical poller at a critical polling frequency, wherein said polling said each CQ of the critical CQ list includes polling said each CQ of the critical CQ list for completion signals or indicators associated with corresponding received critical messages of the local node to be serviced.

20. A system comprising:

one or more processors; and a memory comprising code stored thereon that, when executed, performs a method comprising:

for a first plurality of services, assigning each service of the first plurality a polling priority of a non-critical polling priority or a critical polling priority, wherein each service of the first plurality is associated with a corresponding service queue set of a second plurality of service queue sets of a local node, wherein each service queue set of the second plurality of service queue sets associated with a corresponding service of the first plurality includes a completion queue (CQ) and an associated receiving queue (RQ) of work queue entries (WQEs) associated with received messages that are stored in a first memory of the local node and sent by a remote node via remote direct memory access (RDMA);

partitioning CQs of the second plurality of service queue sets associated with the first plurality of services in accordance with assigned polling priorities to generate a non-critical CQ list of the local node and a critical CQ list of the local node, wherein the non-critical CQ list includes CQs associated with services of the first plurality assigned the non-critical polling priority, and wherein the critical CQ list includes CQs associated with services of the first plurality assigned the critical polling priority;

polling each CQ of the non-critical CQ list on the local node by a non-critical poller at a non-critical polling frequency, wherein said polling said each CQ of the non-critical CQ list includes polling said each CQ of the non-critical CQ list for completion signals or indicators associated with corresponding received non-critical messages of the local node to be serviced; and polling each CQ of the critical CQ list on the local node by a critical poller at a critical polling frequency, wherein said polling said each CQ of the critical CQ list includes polling said each CQ of the critical CQ list for completion signals or indicators associated with corresponding received critical messages of the local node to be serviced.

* * * * *